United States Patent
Jung et al.

(10) Patent No.: US 9,900,797 B2
(45) Date of Patent: Feb. 20, 2018

(54) METHOD AND DEVICE FOR MEASURING SIGNAL IN BEAM FORMING SYSTEM

(71) Applicant: Samsung Electronics Co., Ltd., Gyeonggi-do (KR)

(72) Inventors: Jungsoo Jung, Gyeonggi-do (KR); Hyunkyu Yu, Gyeonggi-do (KR); Youngbin Chang, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 64 days.

(21) Appl. No.: 14/156,342

(22) Filed: Jan. 15, 2014

(65) Prior Publication Data
US 2014/0198681 A1    Jul. 17, 2014

(30) Foreign Application Priority Data
Jan. 15, 2013   (KR) .................... 10-2013-0004602

(51) Int. Cl.
*H04B 7/06*     (2006.01)
*H04W 24/10*    (2009.01)
(Continued)

(52) U.S. Cl.
CPC ............ *H04W 24/10* (2013.01); *H04B 7/063* (2013.01); *H04B 7/0617* (2013.01);
(Continued)

(58) Field of Classification Search
CPC ....... H04B 7/04–7/0897; H04B 17/318; H04B 17/309–17/354; H04B 10/079–10/07957
See application file for complete search history.

(56) References Cited

U.S. PATENT DOCUMENTS

| | | |
|---|---|---|
| 6,640,104 B1 | 10/2003 | Borst et al. |
| 2009/0207077 A1 | 8/2009 | Hwang et al. |

(Continued)

FOREIGN PATENT DOCUMENTS

| | | |
|---|---|---|
| EP | 0935351 A1 | 8/1999 |
| JP | H11261467 A | 9/1999 |

(Continued)

OTHER PUBLICATIONS

International Search Report dated Apr. 30, 2014 in connection with International Patent Application No. PCT/KR2014/000435, 4 pages.

(Continued)

*Primary Examiner* — Hoon J Chung

(57) ABSTRACT

A method and a device for measuring a signal in a beam forming system. A method of measuring a signal by using beam forming by a wireless communication mobile station includes: acquiring a group setting rule that is a criterion for group classification; measuring a signal for each of transmission/reception beam pairs for a preset period of time; classifying the transmission/reception beam pairs into two or more transmission/reception beam groups according to the measured signal and the group setting rule; and performing signal measurement and report for the transmission/reception beam pairs belonging to the respective transmission/reception beam groups according to a measurement rule corresponding to the corresponding transmission/reception beam group. The device and the method efficiently measure the signal.

26 Claims, 14 Drawing Sheets

(51) Int. Cl.
*H04B 17/309* (2015.01)
*H04B 17/318* (2015.01)
*H04B 7/08* (2006.01)
*H04W 72/04* (2009.01)
*H04W 72/12* (2009.01)

(52) U.S. Cl.
CPC ......... *H04B 7/0634* (2013.01); *H04B 7/0695* (2013.01); *H04B 7/088* (2013.01); *H04B 17/309* (2015.01); *H04B 17/318* (2015.01); *H04W 72/042* (2013.01); *H04W 72/1231* (2013.01)

(56) References Cited

U.S. PATENT DOCUMENTS

| | | |
|---|---|---|
| 2009/0312044 A1 | 12/2009 | Hottinen |
| 2011/0080267 A1 | 4/2011 | Clare et al. |
| 2011/0110453 A1 | 5/2011 | Narayan et al. |
| 2011/0113137 A1 | 12/2011 | Ramachandran et al. |
| 2011/0309980 A1 | 12/2011 | Ali et al. |
| 2012/0224616 A1 | 9/2012 | Richards |
| 2013/0040684 A1* | 2/2013 | Yu .................. H04B 7/0617 455/517 |
| 2013/0231058 A1 | 5/2013 | Ramachandran et al. |
| 2013/0231059 A1 | 5/2013 | Prasad et al. |
| 2015/0230263 A1* | 8/2015 | Roy .................. H04W 36/0083 455/452.2 |

FOREIGN PATENT DOCUMENTS

| | | |
|---|---|---|
| JP | 2001245338 A | 9/2001 |
| JP | 2011082876 A | 4/2011 |
| WO | WO 2008/051625 A2 | 5/2008 |

OTHER PUBLICATIONS

European Search Report, "Supplementary European Search Report," dated Aug. 19, 2016, 9 pages, European Patent Office, Munich, Germany.

Foreign Communication from Related Counterpart Application; Japanese Patent Application No. 2015-552591; Notice of Allowance dated Nov. 22, 2017; 6 pages.

* cited by examiner

METHOD AND DEVICE FOR MEASURING SIGNAL IN BEAM FORMING SYSTEM

CROSS-REFERENCE TO RELATED APPLICATION(S) AND CLAIM OF PRIORITY

The present application is related to and claims the benefit under 35 U.S.C. § 119(a) of a Korean patent application filed on Jan. 15, 2013 in the Korean Intellectual Property Office and assigned Serial No. 10-2013-0004602, the entire disclosure of which is hereby incorporated by reference.

TECHNICAL FIELD

The present disclosure relates generally to a method and a device for measuring a signal, and more particularly, to a method and a device for effectively measuring a signal state in a beam forming system.

BACKGROUND

An amount of average data used by mobile communication users has been geometrically increased with use of a mobile station such as a smart phone. In addition to that, users' demands for a higher data transmission rate have been continuously increased. A method of providing a generally high data transmission rate includes a method of providing communication using a wider frequency band and a method of increasing frequency usage efficiency. However, it is very difficult to provide the higher average data transmission rate through the later method. This is because communication technologies of a current generation provide frequency usage efficiency close to a theoretical limit and thus, it is very difficult to increase the frequency usage efficiency up to that or more through a technical improvement. Accordingly, it can be said that a feasible method for increasing the data transmission rate is a method of providing data services through the wider frequency band. At this time, the thing to consider is an available frequency band. In view of the current frequency distribution policy, a band in which a broadband communication of 1 GHz or more is possible is limited and a practically selectable frequency band is only the millimeter wave band of 30 GHz or more. Such a signal of the high frequency band causes severe signal attenuation according to a distance differently from a signal of a frequency band of 2 GHz used by the conventional cellular systems. Due to such signal attenuation, service providing coverage of a base station using the same power as the conventional cellular systems will be considerably reduced. In order to solve this problem, a beam forming technique is widely used which concentrates transmission/reception power into a narrow space to increase transmission/reception efficiency of an antenna.

FIG. 1 illustrates a base station and a mobile station for providing beam forming by using an array antenna.

Referring to FIG. 1, each of cells Cell-0, Cell-1, and Cell-2 of the base station 110 includes a plurality of array antennas Array 0 and Array 1. The base station 110 may transmit data, while changing a direction of a downlink transmission beam Tx by using the array antennas Array 0 and Array 1. In addition, a mobile station 130 may also receive data while changing a direction of a reception beam Rx.

In a system for performing communication by using the beam forming technique, the base station 110 and the mobile station 130 provide data services by selecting a direction of transmission beams and a direction of reception beams showing an optimal channel environment among various directions of the transmission beams and the reception beams. Such a process is identically applied to an uplink channel for transmitting data from the mobile station 130 to the base station 110 as well as a downlink channel for transmitting data from the base station 110 to the mobile station 130.

When the number of directions of a transmissible beam of the base station 110 is N and the number of directions of a receivable beam of the mobile station 130 is M, an optimal downlink transmission/reception direction is selected through the following simplest method. The base station 110 transmits a previously promised signal at least M times or more in each of the N transmissible directions, and the mobile station 130 receives the N transmission beams by using M reception beams. According to such a method, the base station 110 should transmit a specific reference signal at least N×M times, and the mobile station 130 should receive the reference signal N×M times to measure reception strength of the received signal. The mobile station 130 may determine the direction corresponding to the measurement value with the highest reception strength among the N×M measurement values as an optimal transmission/reception beam direction, namely, a combination of an optimal transmission beam direction and an optimal reception beam direction. The process of transmitting a signal one or more times in every transmittable direction by the base station 110 as described above is referred to as a beam sweeping process, and the process of selecting the optimal transmission/reception beam direction by the mobile station 130 is referred to as a beam selection process. The process of selecting the optimal downlink transmission/reception beam may also be identically applied to an uplink transmission/reception process of transmitting data from the mobile station 130 to the base station 110.

FIG. 2 illustrates a signal transmission scheme of a base station 110 in a beam forming system.

Referring to FIG. 2, the base station 110 is installed at a location of a specific height 201 and has a predetermined beam width 202. The beam width of the base station may be defined for each of an elevation angle and an azimuth. Further, a transmission beam of the base station 110 transmitted in a direction corresponding to a specific elevation angle 203 is illustrated in FIG. 2. Since the base station 110 is generally located at a location higher than the mobile station 130, the term "declination angle" may also be used instead of the elevation angle. However, the term "elevation angle" will be used hereinafter. The azimuth is omitted in FIG. 2

FIG. 3 illustrates combinations of elevation angles and azimuths of a transmission beam transmitted from a base station 110. The base station 110 is installed in such a way as illustrated in FIG. 2. The base station 110 is installed at a height of 35 m. The base station 110 transmits a transmission beam having a beam width of 5 degrees for each of the elevation angle and the azimuth. The base station 110 transmits such a transmission beam within one sector having coverage of an angle of 30 degrees and a distance of 200 meters. Each of mobile stations may use four reception beams RX1, RX2, RX3, and RX4. FIG. 3 illustrates a case in which the base station 110 configures one sector having the coverage of the angle of 30 degrees and the distance of 200 meters by using ninety six transmission beams having the beam width of 5 degrees for each of the elevation angle and the azimuth.

The transmission beams transmitted by the base station 110 are spread and transmitted in a fan shape when there is no obstacle. However, for convenience of description, each of the transmission beams reaches the ground, with a rectangular shape in the embodiment illustrated in FIG. 3. The rectangles illustrated in FIG. 3 represent ninety six areas where the transmission beam with a specific elevation angle and a specific azimuth reaches the ground. The ninety six transmission beams are transmitted to a more remote area with the elevation angle increased, and the transmission beam transmitted far from the base station is received in a larger area while receding from the base station. The percentage written in each rectangle in FIG. 3 indicates a ratio of an area occupied by a corresponding region in which a transmission beam transmitted to a predetermined position is received, in the entire 96 regions. As illustrated in FIG. 3, it can be seen that the transmission beam transmitted to a boundary area of the base station is received in a very large area as compared with the transmission beam transmitted to an area close to a central region although the transmission beams have the same elevation angle and azimuth. (As illustrated in FIG. 3, assuming a base station height of 35 m and coverage of 200 m, there is a difference of up to 480 times between areas of reception regions.)

In the beam forming system, the mobile station has difficulty in forming a number of transmission/reception beams with a fine beam width similarly to the base station, due to limitations on a physical space, capability, price, and the like. In the embodiment illustrated in FIG. 3, the mobile station 130 forms four reception beams RX1, RX2, RX3, and RX4 to receive the transmission beams transmitted by the base station. In this case, an azimuth beam width of the reception beams is about 90 degrees.

In a case of using transmission beams with a narrow elevation angle and a narrow azimuth as illustrated in FIG. 3, a number of transmission beams and reception areas exist within the base station 110. Particularly, in a case of transmitting a downlink synchronization channel and broadcast control channels, which are transmitted through a sweeping method, by using the narrow transmission beams as illustrated in FIG. 3, repetitive transmission is required one or more times, namely, at least ninety six times toward all narrow transmission beams within the base station 110.

The number of transmissions required for transmitting the downlink synchronization channel and the broadcast control channels through the beam sweeping method is proportion to the number of transmission beams existing within the coverage of the base station 110. Accordingly, the simplest method of reducing transmission overhead of the downlink synchronization channel and the broadcast control channels in the base station 110 as illustrated in FIG. 3 is to support the whole coverage of the base station 110 with a smaller number of transmission beams. For this purpose, the beam width of each transmission beam should be relatively wide.

However, as the beam width increases, a beam forming effect generally decreases in proportion to the beam width. That is, as the beam width decreases, the beam forming effect further increases. When the beam width is decreased for an improvement of the beam forming effect, the number of transmission beams required for supporting one base station area is accordingly increased and thus, the overhead required for transmitting broadcast type channels is increased. As described above, the beam forming effect and the broadcast channel transmission overhead have a trade-off relation.

In order to effectively solve such a problem, a method is generally used for diversifying the beam width used for transmitting broadcast channels and the beam width used for transmitting user data. For example, a transmission beam with a beam width of 30 degrees may be used as a transmission beam for transmitting the broadcast channels by a sector of 60 degrees, and a transmission beam with a beam width of 10 degrees may be used as a transmission beam for transmitting the user data. In the method of using two or more different beam widths as in the aforementioned example, the transmission beam with a relatively large beam width is referred to as a wide beam or a coarse beam. On the other hand, the transmission beam with a relatively small beam width is referred to as a narrow beam or a fine beam. The similar terms may be used in the same way, even in the case where a method of using two or more different beam widths for reception beams is used.

In a general communication system, a mobile station should measure reception capability of a downlink wireless channel used for receiving data and report the measurement value to a base station prior to data reception in order to receive data from a base station through a downlink. The base station determines a time point of scheduling the mobile station and a data transmission rate suitable for a channel situation of the mobile station, by using the reported reception capability information of the wireless channel. In an uplink through which the mobile station transmits data to the base station, the base station directly measures reception capability of an uplink wireless channel and schedules uplink data transmission based on the measured information.

An operation of transmitting/receiving data in the beam forming system is the same as the transmission/reception operation of the general communication system. However, in the beam forming system, the number of wireless channels (or resources) capable of transmitting/receiving data is increased by the number of transmission/reception beam pairs. Namely, in the beam forming system using the narrow transmission beams as in FIG. 3, the base station 110 may transmit data to the mobile station 130 at a specific location, by selecting one or more transmission beams among the narrow transmission beams that the mobile station 130 can receive. In order to help the base station 110 select a transmission beam, the mobile station 130 receives reference signals transmitted through the respective narrow transmission beams by using each of the reception beams and reports the measured signal strength to the base station.

Such a frequent signal measurement causes excessive power consumption of the mobile station 130. Further, considerable uplink resources should be allocated so that the mobile stations 130 may report the measurement result. Thus, when the report resources are allocated to all the mobile stations 130, a lot of resources are used for transmission of control information, thereby deteriorating system efficiency.

SUMMARY

To address the above-discussed deficiencies, it is a primary object to provide a device and a method in which a signal can be efficiently measured.

In accordance with one aspect of the present disclosure, a method of measuring a signal by using beam forming by a wireless communication mobile station is provided. The method includes: acquiring a group setting rule that is a criterion for group classification; measuring a signal for each of transmission/reception beam pairs for a preset period of time; classifying the transmission/reception beam pairs into two or more transmission/reception beam groups according to the measured signal and the group setting rule; and performing signal measurement and report for the transmission/reception beam pairs belonging to the respective transmission/reception beam groups according to a measurement rule corresponding to the corresponding transmission/reception beam group.

In accordance with one aspect of the present disclosure, a method of receiving a measurement report by using beam forming by a wireless communication base station is provided. The method includes: receiving a signal measurement result from a mobile station; determining whether to reset transmission/reception beam groups, by analyzing the signal measurement result; and transmitting, to the mobile station, an instruction for the resetting of the transmission/reception beam groups and information required for the resetting of the transmission/reception beam groups when the resetting of the transmission/reception beam groups is necessary.

In accordance with one aspect of the present disclosure, a wireless communication mobile station using beam forming for measuring a signal is provided. The wireless communication mobile station includes: a controller that acquires a group setting rule that is a criterion for group classification; and a communication unit that measures a signal for each of transmission/reception beam pairs for a preset period of time. The controller may classify the transmission/reception beam pairs into two or more transmission/reception beam groups according to the measured signal and the group setting rule. The communication unit may perform signal measurement and report for the transmission/reception beam pairs belonging to the respective transmission/reception beam groups according to a measurement rule corresponding to the corresponding transmission/reception beam group.

In accordance with one aspect of the present disclosure, a wireless communication base station using beam forming is provided. The wireless communication base station includes: a communication unit that receives a signal measurement result from a mobile station; and a controller that determines whether to reset transmission/reception beam groups, by analyzing the signal measurement result. The communication unit may transmit, to the mobile station, an instruction for the resetting of the transmission/reception beam groups and information required for the resetting of the transmission/reception beam groups when the resetting of the transmission/reception beam groups is necessary.

According to the present disclosure as described above, the device and the method for efficiently measuring the signal can be provided.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
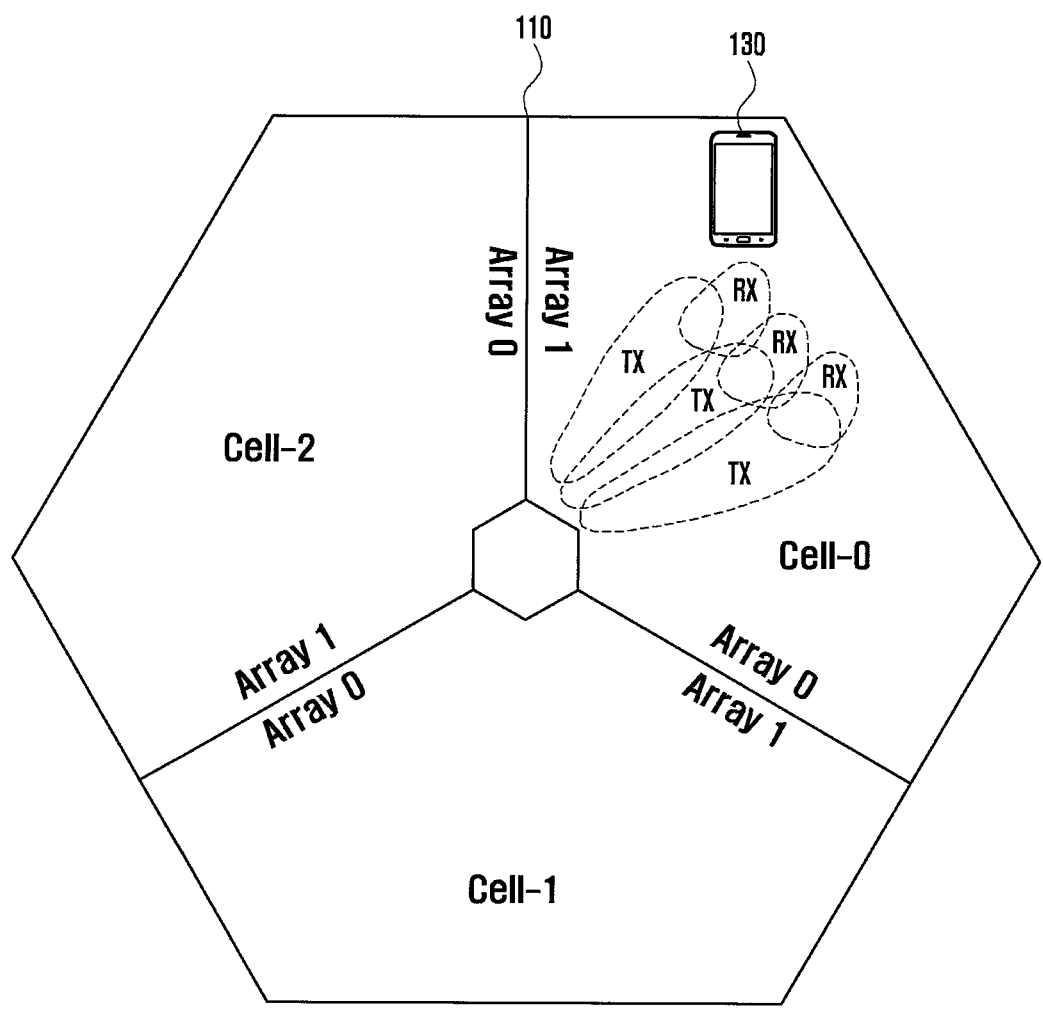
FIG. 1 illustrates a base station and a mobile station for providing beam forming by using an array antenna.
Figure 2:
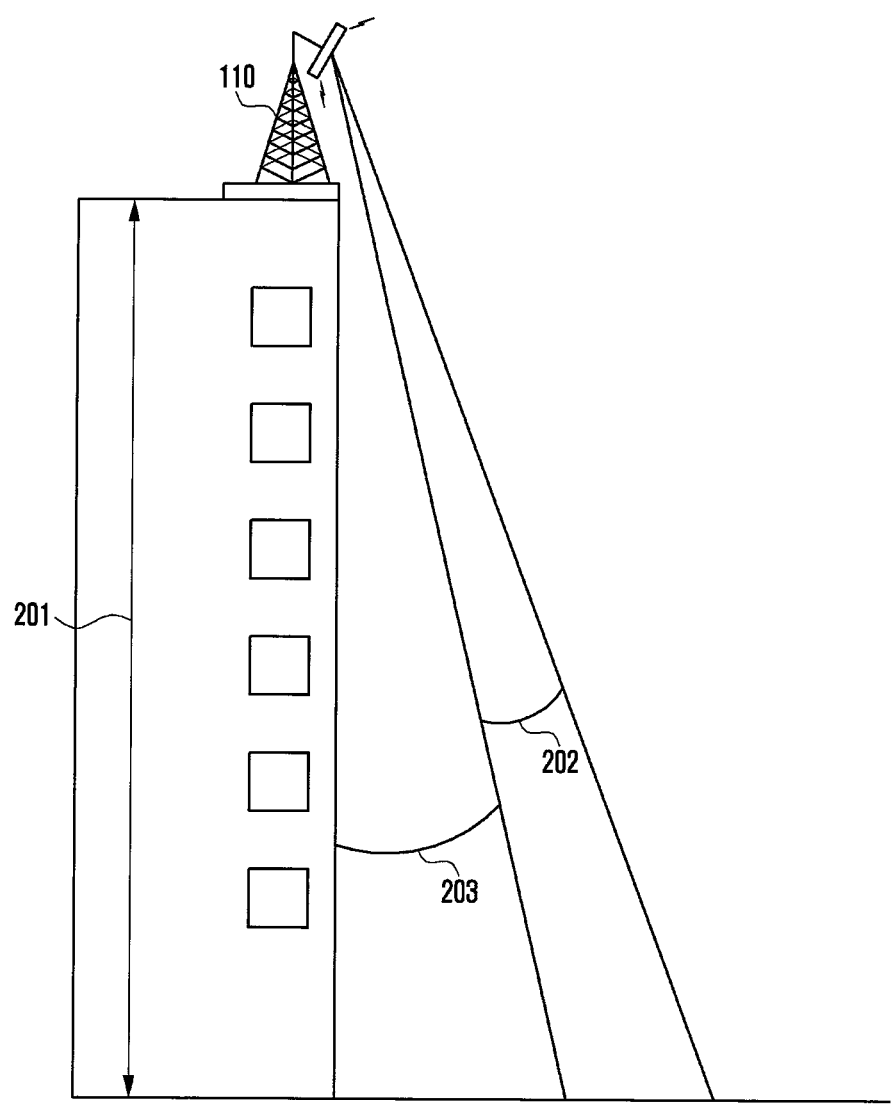
FIG. 2 illustrates a signal transmission scheme of a base station 110 in a beam forming system.
Figure 3:
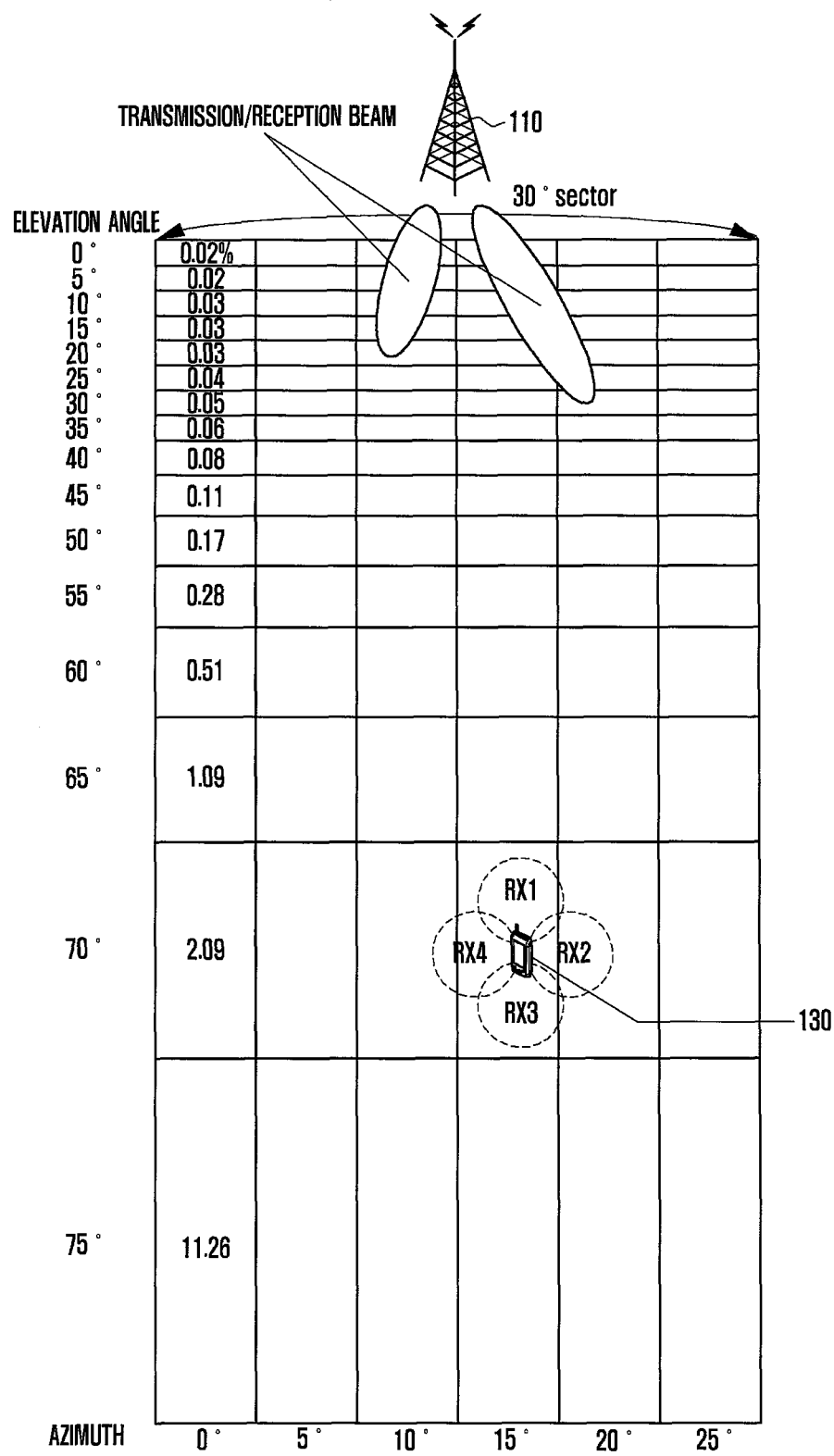
FIG. 3 illustrates combinations of elevation angles and azimuths of a transmission beam transmitted from a base station 110.

FIGS. 4 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device. Hereinafter, operation principles of exemplary embodiments of the present disclosure will be described in detail with reference to accompanying drawings. Identical elements illustrated in the drawings are denoted by identical reference numerals where possible although illustrated in different drawings, and hereinafter, in describing the present disclosure, detailed descriptions related to well-known functions or configurations will be omitted when they may make subject matters of the present disclosure unnecessarily obscure. Terms described later are defined in consideration of functions of the present disclosure, but may vary according to the intention or convention of a user or operator. Accordingly, the terms should be defined based on the contents over the whole present specification.

In an embodiment of the present disclosure, a method is proposed for dividing transmission/reception beams between a transmitter and a receiver into one or more groups according to beam forming characteristics, beam forming capability of the transmitter and the receiver, importance of information on the corresponding transmission/reception beam in a scheduling operation of the transmitter, and the like. To this end, in the method proposed by the present disclosure, the transmitter should repeatedly transmit a reference signal for each of transmission beams once or more by using the corresponding transmission beam, and the receiver should measure signal strength by receiving the reference signal for the transmission beam transmitted by the transmitter by using each of the reception beams of the receiver.

In an embodiment of the present disclosure, among transmission/reception beam pairs (combinations) measured by the receiver, the transmission/reception beam having the highest signal strength is defined as a transmission/reception beam having the highest priority in the scheduling operation of the transmitter. Further, in an embodiment of the present disclosure, combinations of the reception beam included in the transmission/reception beam combination having the highest signal strength measured by a mobile station and several transmission beams received through the reception beam are defined as a transmission/reception beam group having a higher priority than combinations of other reception beams and transmission beams received through the other reception beams.

In an embodiment of the present disclosure, a method is proposed for defining transmission/reception beam combinations having reception signal strength higher than a first threshold value among the several transmission beams received through the same reception beam as the transmission/reception beam having the highest signal strength measured by the receiver as another transmission/reception beam group. Further, in an embodiment of the present disclosure, a method is proposed for defining transmission/reception beams having reception signal strength lower than a second threshold value among the several transmission beams received through the same reception beam as the reception beam of the transmission/reception beam combination having the highest signal strength measured by the receiver as another transmission/reception beam group. Furthermore, in an embodiment of the present disclosure, a method is proposed for defining transmission/reception beam combinations having reception signal strength higher than a third threshold value or lower than a fourth threshold value among several transmission beams received through a reception beam different from the reception beam of the transmission/reception beam combination having the highest signal strength measured by the receiver as another transmission/reception beam group.

Further, in an embodiment of the present disclosure, a method is proposed for defining transmission beams not belonging to the transmission beam group among the several transmission beams received through the reception beam of the transmission/reception beam combination having the highest signal strength measured by the receiver as another transmission/reception beam group. Furthermore, in an embodiment of the present disclosure, a method is proposed for defining transmission beams not belonging to the transmission beam group among the several transmission beams received through the reception beam different from the reception beam of the transmission/reception beam combination having the highest signal strength measured by the receiver as another transmission/reception beam group.

Further, in an embodiment of the present disclosure, a method is proposed for measuring a reference signal at different periods and reporting the measurement results at different periods for the transmission/reception beams belonging to the respective groups according to beam forming characteristics, beam forming capability of the transmitter and the receiver, importance of information on the corresponding transmission/reception beam in a scheduling operation of the transmitter, and the like. Furthermore, in various embodiments of the present disclosure, a method is proposed for reporting the signal measurement results for the transmission beams belonging to the respective groups through different communication channels according to beam forming characteristics, beam forming capability of the transmitter and the receiver, importance of information on the corresponding transmission/reception beam in a scheduling operation of the transmitter, and the like. Moreover, in various embodiments of the present disclosure, a method is proposed for reporting the measurement results with different contents for the transmission beams belonging to the respective groups.

Hereinafter, in an embodiment of the present disclosure, contents proposed in the present specification will be described with reference to an example of a downlink in which a base station of a general communication system corresponds to a transmitter and a mobile station corresponds to a receiver. However, the contents of the present disclosure may also be generally applied to an uplink in which a mobile station corresponds to a transmitter and a base station corresponds to a receiver.

Figure 4:
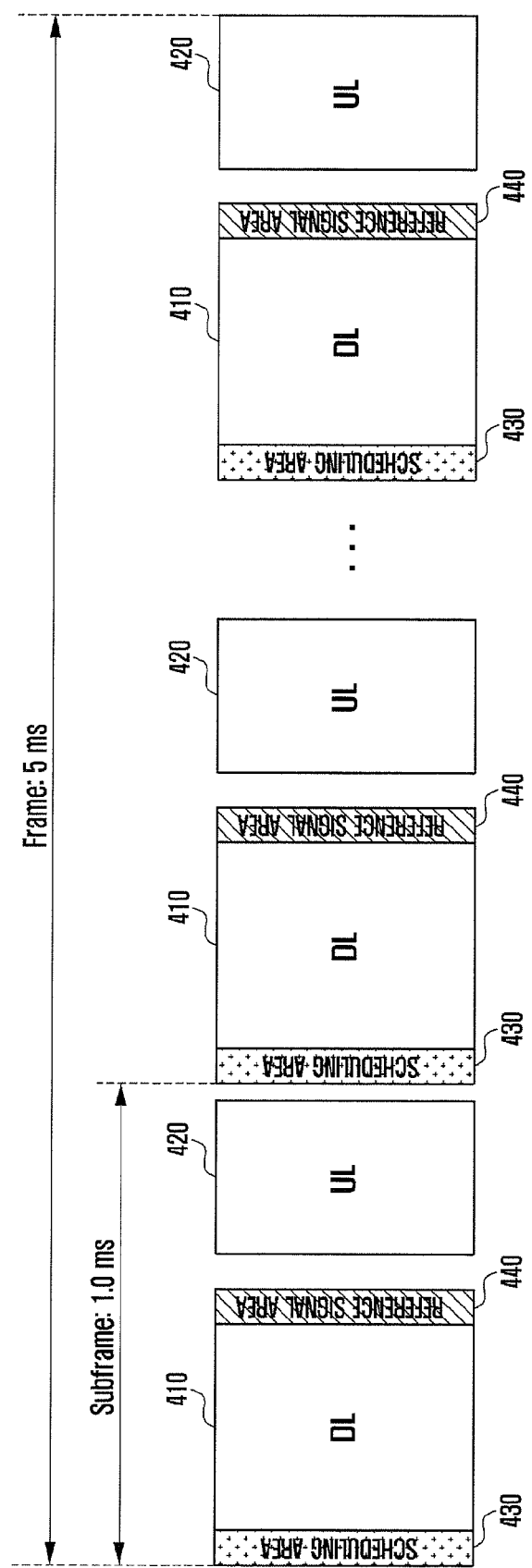
FIG. 4 illustrates a frame structure for transmitting/receiving a signal in a communication system according to an embodiment of the present disclosure.

FIG. 4 illustrates a frame structure for transmitting/receiving a signal in a communication system according to an embodiment of the present disclosure.

Referring to FIG. 4, one frame has duration of 5 ms and is configured with five sub-frames. Each of the sub-frames is divided into downlink transmission duration 410 for transmitting a signal from a base station to a mobile station and uplink transmission duration 420 for transmitting a signal from the mobile station to the base station. Referring to FIG. 4, a part of the downlink data transmission duration 410 is used as a scheduling area 430 for transmitting scheduling information, and a part of the downlink data transmission duration 410 is used as duration 440 for transmitting a downlink reference signal.

In various embodiments of the present disclosure, the base station repeatedly transmits a reference signal for each of transmission beams once or more through the downlink reference signal area 440 illustrated in FIG. 4 by using the corresponding transmission beam. In the method proposed by the present disclosure, the mobile station should measure signal strength and/or delay, and other channel states by receiving the reference signal of the transmission beam transmitted by the base station, using each of reception beams of the mobile station.

In various embodiments of the present disclosure, among the transmission/reception beam pairs measured by the mobile station, the transmission/reception beam having the highest signal strength is defined as a transmission/reception beam having the highest priority in a scheduling operation of the base station. In the present embodiment, the transmission/reception beam combination having the highest signal strength is defined as a first transmission/reception beam group. In the present embodiment, when scheduling a specific mobile station, the base station may determine that data can be transmitted at the highest data transmission rate in a case where the transmission beam belonging to the first transmission/reception beam group of the mobile station is used. State information on the transmission/reception beam pair belonging to the first transmission/reception beam group should be more frequently measured than any other transmission/reception beam since the state information is significantly used during the scheduling.

The mobile station measures the reference signal of the transmission beam of the transmission/reception beam pair belonging to the first transmission/reception beam group among the transmission beams transmitted by the base station through the downlink reference signal area 440 by using the reception beam of the transmission/reception beam pair belonging to the corresponding first transmission/reception beam group, in order to measure reception capability of the transmission/reception beam pair belonging to the first transmission/reception beam group. During this process, the mobile station may easily measure the reference signals of other transmission beams transmitted by the base station, by using the same reception beam. Accordingly, in various embodiments of the present disclosure, several transmission beams received through the same reception beam as the transmission/reception beam having the highest signal strength measured by the mobile station are defined as a transmission/reception beam group having a higher priority than information received through other reception beams.

In various embodiments of the present disclosure, a method is proposed for defining transmission/reception beams having reception signal strength higher than a first threshold value among several transmission beams received through the reception beam of the transmission/reception beam pair having the highest signal strength measured by the mobile station as a second transmission/reception beam group. In the method proposed in various embodiments of the present disclosure, the first threshold value may be defined as signal strength corresponding to a specific data transmission rate. For example, the first threshold value may be defined as signal strength corresponding to the lowest data transmission rate capable of satisfying a service level required by the mobile station. In the method proposed in various embodiments of the present disclosure, when scheduling a specific mobile station, the base station may determine that data can be transmitted at the data transmission rate satisfying the service level required by the mobile station in a case where the transmission beams belonging to the second transmission/reception beam group of the mobile station are used.

Further, in various embodiments of the present disclosure, a method is proposed for defining transmission/reception beams having reception signal strength lower than a second threshold value among the several transmission beams received through the reception beam of the transmission/reception beam pair having the highest signal strength measured by the mobile station as a third transmission/reception beam group. In the method proposed in various embodiments of the present disclosure, the second threshold value may be defined as signal strength corresponding to a specific data transmission rate or minimum signal strength at which data can be transmitted. In the method proposed in various embodiments of the present disclosure, when the second threshold value is set to a sufficiently low value, the third transmission/reception beam group is configured with pairs of transmission and reception beams having low reception signal strength for the mobile station. When transmitting data to other users by using the transmission beams belonging to the third transmission/reception beam group of the mobile station, the base station may determine that an interference exerted on the mobile station may correspond to a level of the second threshold value.

Further, in various embodiments of the present disclosure, a method is proposed for defining transmission/reception beams having reception signal strength higher than a third threshold value among several transmission beams received through reception beams different from the reception beam belonging to the transmission/reception beam pair having the highest signal strength measured by the mobile station as a fourth transmission/reception beam group. In the method proposed in various embodiments of the present disclosure, the third threshold value may be defined as signal strength corresponding to a specific data transmission rate. For example, the third threshold value may be defined as signal strength corresponding to lowest data transmission rate capable of satisfying a service level required by the mobile station. In the case where the third threshold value is defined as in the aforementioned embodiment, when scheduling a specific mobile station, the base station may determine that data can be transmitted at the data transmission rate satisfying the service level required by the mobile station if the transmission beams belonging to the fourth transmission/reception beam group of the mobile station are used.

Further, in various embodiments of the present disclosure, a method is proposed for defining transmission/reception beams having reception signal strength lower than a fourth threshold value among the several transmission beams received through reception beams different from the reception beam of the transmission/reception beam pair having the highest signal strength measured by the mobile station as a fifth transmission/reception beam group. In the method proposed in various embodiments of the present disclosure, the fourth threshold value may be defined as signal strength corresponding to a specific data transmission rate or minimum signal strength at which data can be transmitted. In the method proposed in various embodiments of the present disclosure, when the fourth threshold value is set to a sufficiently low value, the fifth transmission/reception beam group is configured with pairs of transmission and reception beams having low reception signal strength for the mobile station. When transmitting data to other users by using the transmission beams belonging to the fifth transmission/reception beam group of the mobile station, the base station may determine that an interference exerted on the mobile station may correspond to a level of the fourth threshold value.

Further, in an embodiment of the present disclosure, a method is proposed for defining the transmission beams not belonging to the transmission beam group among the several transmission beams received through the reception beam of the transmission/reception beam pair having the highest signal strength measured by the mobile station as a sixth transmission/reception beam group.

Furthermore, in various embodiments of the present disclosure, a method is proposed for defining the transmission beams not belonging to the transmission beam group among the several transmission beams received through the reception beam different from the reception beam of the transmission/reception beam pair having the highest signal strength measured by the mobile station as a seventh transmission/reception beam group.

Figure 5:
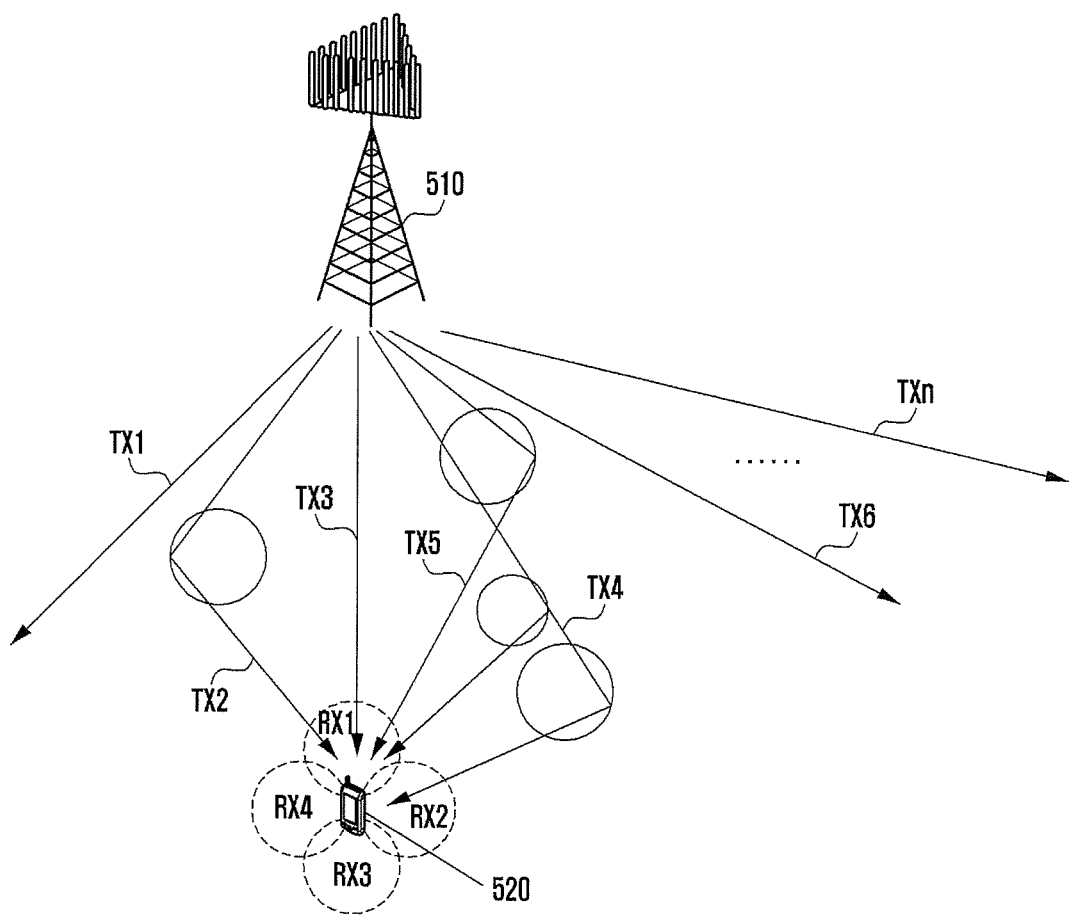
FIG. 5 illustrates beam transmission/reception between a base station 510 and a mobile station 520 according to an embodiment of the present disclosure.

FIG. 5 illustrates beam transmission/reception between a base station 510 and a mobile station 520 according to an embodiment of the present disclosure.

Referring to FIG. 5, one base station 510 repeatedly transmits a reference signal for each of n transmission beams TX1 to TXn by using the corresponding transmission beam once or more. The mobile station 520 receives the reference signal by using four reception beams RX1 to RX4. In the embodiment illustrated in FIG. 5, the mobile station 520 measures that signal strength is higher than or equal to specific strength set in advance, when receiving the transmission beams TX2, TX3, TX4, and TX5 through the reception beam RX1. Further, the mobile station 520 measures that signal strength is higher than or equal to the specific strength, when receiving the transmission beam TX4 through the reception beam RX2.

Figure 6:
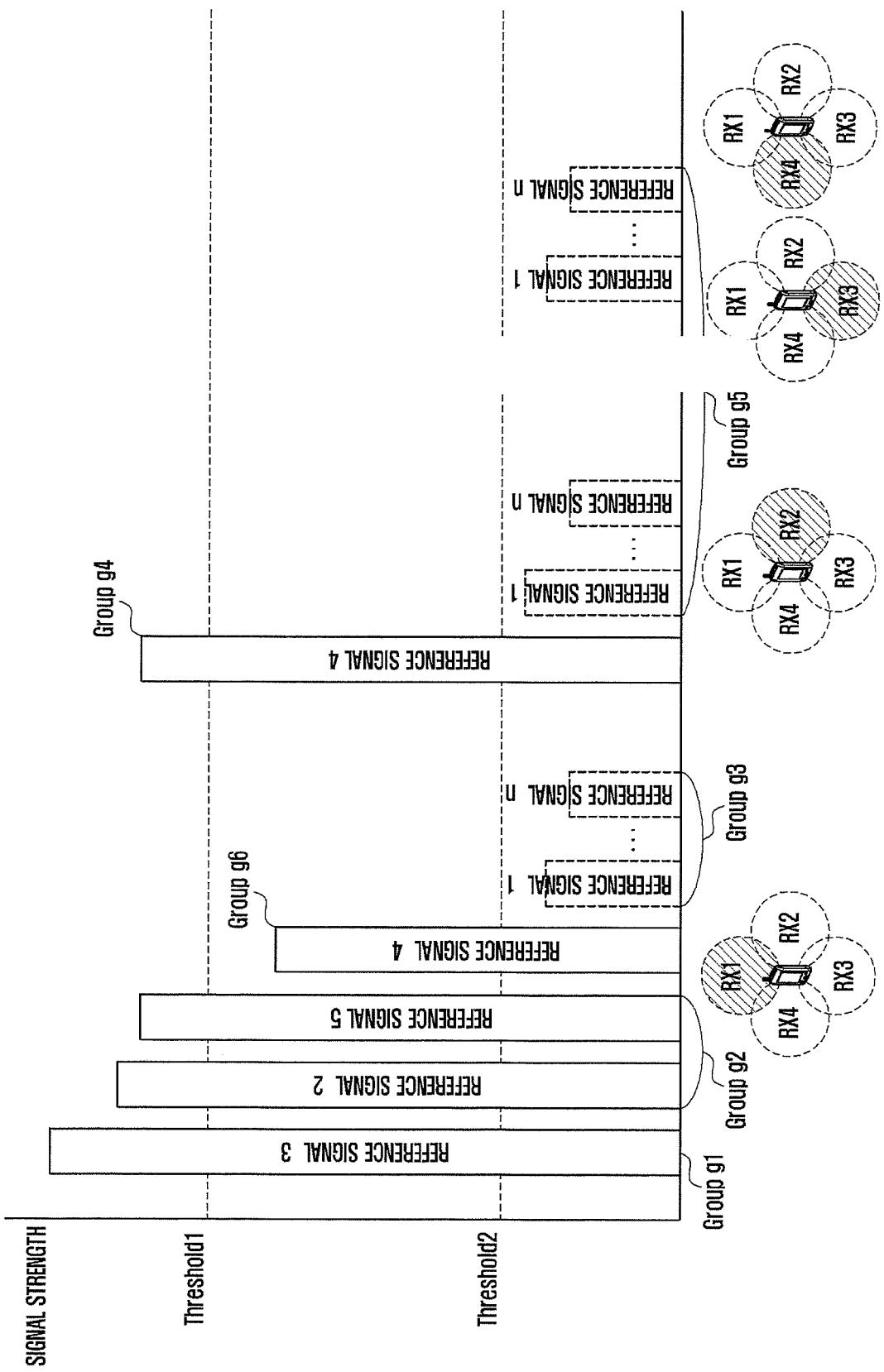
FIG. 6 illustrates reception signal strength of the transmission beams received through the respective reception beams in the embodiment illustrated in FIG. 5 and a group relation between the transmission beams.

FIG. 6 illustrates reception signal strength of the transmission beams received through the respective reception beams in the embodiment illustrated in FIG. 5 and a group relation between the transmission beams. In the embodiment illustrated in FIG. 6, it is assumed that a third threshold value is identical to a first threshold value and a fourth threshold value is identical to a second threshold value.

In the embodiment illustrated in FIG. 6, a reference signal of the transmission beam TX3 received through the reception beam RX1 represents the highest reception signal strength. The most optimal pair/combination of a transmission beam and a reception beam is defined as a first transmission/reception beam group g1 in the present embodiment. Namely, the corresponding downlink transmission/reception beam pair (TX3, RX1) is defined as the first transmission/reception beam group g1. Hereinafter, for convenience, a transmission/reception beam pair is denoted in a form of (a transmission beam, a reception beam). An order of the transmission beam and the reception beam may be reversed in the formation of the transmission/reception beam pair. A reference signal 1, a reference signal 2, . . . , a reference signal n illustrated in FIG. 6 correspond to the transmission beams TX1, TX2, . . . , TXn, respectively. The same correspondence relation is formed even in the case of FIGS. 8 to 10.

Further, in the present embodiment, when strength of signals transferred through combinations of the reception beam belonging to the first group and other transmission beams not belonging to the first group exceeds the first threshold value, the combination of the corresponding transmission beam and the corresponding reception beam is defined as a second transmission/reception beam group g2. For example, in the embodiment illustrated in FIG. 6, since signal strength of a reference signal of the transmission beams TX2 and TX5 received through the reception beam RX1 exceeds the first threshold value, transmission/reception beam combinations (TX2, RX1) and (TX5, RX1) are defined as the second transmission/reception beam group g2. The first threshold value may be defined as signal strength corresponding to lowest data transmission rate capable of satisfying Quality of Service (QoS) required by the mobile station.

In the present embodiment, when the strength of the signals transferred through the combinations of the reception beam belonging to the first group and the other transmission beams not belonging to the first group is lower than a second threshold value, the corresponding transmission/reception beam combination is defined as a third transmission/reception beam group g3. In the embodiment illustrated in FIG. 6, among the transmission beams received through the reception beam RX1, the remaining transmission beams TX1 and TX6, TXn except for the transmission beams TX2, TX3, TX4, and TX5 are received with signal strength lower than the second threshold value so that transmission/reception beam combinations (TX1, RX1), (TX6, RX1), . . . , (TXn, RX1) are defined as the third transmission/reception beam group g3. The second threshold value may be defined as minimum signal strength at which data can be transmitted.

In the present embodiment, when the strength of the signals transferred through the combinations of the reception beam belonging to the first group and the other transmission beams not belonging to the first group is higher than or equal to the second threshold value and lower than or equal to the first threshold value, the corresponding transmission/reception beam combination is defined as a sixth transmission/reception beam group g6. Since the signal strength of the transmission beam TX4 received through the reception beam RX1 is lower than or equal to the first threshold value and higher than or equal to the second threshold value, the transmission/reception beam pair (TX4, RX1) is defined as the sixth transmission/reception beam group g6.

In the embodiment illustrated in FIG. 6, signal strength of a reference signal through a transmission/reception beam pair of the reception beam RX2 among the remaining reception beams except for the reception beam RX1 and the transmission beam TX4 is measured to be higher than the third threshold value (i.e., the first threshold value). In this case, the transmission/reception beam pair (TX4, RX2) is defined as a fourth transmission/reception beam group g4. Further, except for the transmission/reception beam (TX4, RX2), the remaining transmission beams received through the reception beams RX2, RX3, and RX4 are received with signal strength lower than the fourth threshold value (i.e., the second threshold value) and the transmission/reception beam pairs thereof are defined as a fifth transmission/reception beam group g5. In the embodiment illustrated in FIG. 6, the transmission/reception beams received through the remaining reception beams RX2, RX3, and RX4 except for the reception beam RX1 are defined as the fourth or fifth transmission/reception beam group so that there is no transmission/reception beam belonging to a seventh transmission/reception beam group which will be described below.

The classification process of the transmission/reception beam groups as illustrated in FIG. 6 is briefly summarized as follow.

First transmission/reception beam group: one transmission/reception beam pair with the highest signal strength—(TX3, RX1)

Second transmission/reception beam group: among the transmission/reception beam pairs with the signal strength exceeding the first threshold value, the transmission/reception beam pairs of which the reception beam is the reception beam RX1 of the first transmission/reception beam group and of which the transmission beam is not the transmission beam TX3 of the first transmission/reception beam group—(TX2, RX1) and (TX5, RX1)

Third transmission/reception beam group: among the transmission/reception beam pairs with the signal strength lower than the second threshold value, the transmission/reception beam pairs of which the reception beam is the reception beam RX1 of the first transmission/reception beam group—(TX1, RX1), (TX6, RX1), . . . , (TXn, RX1)

Fourth transmission/reception beam group: among the transmission/reception beam pairs with the signal strength exceeding the third threshold value, the transmission/reception beam pair of which the reception beam is not the reception beam RX1 of the first transmission/reception beam group—(TX4, RX2)

Fifth transmission/reception beam group: among the transmission/reception beam pairs with the signal strength lower than the fourth threshold value, the transmission/ reception beam pairs of which the reception beam is not the reception beam RX1 of the first transmission/reception beam group—(TX1, RX2), (TX2, RX2), (TX3, RX2), ..., (TX5, RX2), ..., (TXn, RX2), (TX1, RX3), ..., (TXn, RX3), (TX1, RX4), ..., (TXn, RX4)

Sixth transmission/reception beam group: among the transmission/reception beam pairs with the signal strength lower than or equal to the first threshold value and higher than or equal to the second threshold value, the transmission/reception beam pair of which the reception beam is the reception beam RX1 of the first transmission/reception beam group—(TX4, RX1)

Seventh transmission/reception beam group: among the transmission/reception beam pairs with the signal strength lower than or equal to the third threshold value and higher than or equal to the fourth threshold value, the transmission/reception beam pair of which the reception beam is not the reception beam RX1 of the first transmission/reception beam group—non-existent in FIG. 6

Figure 7:
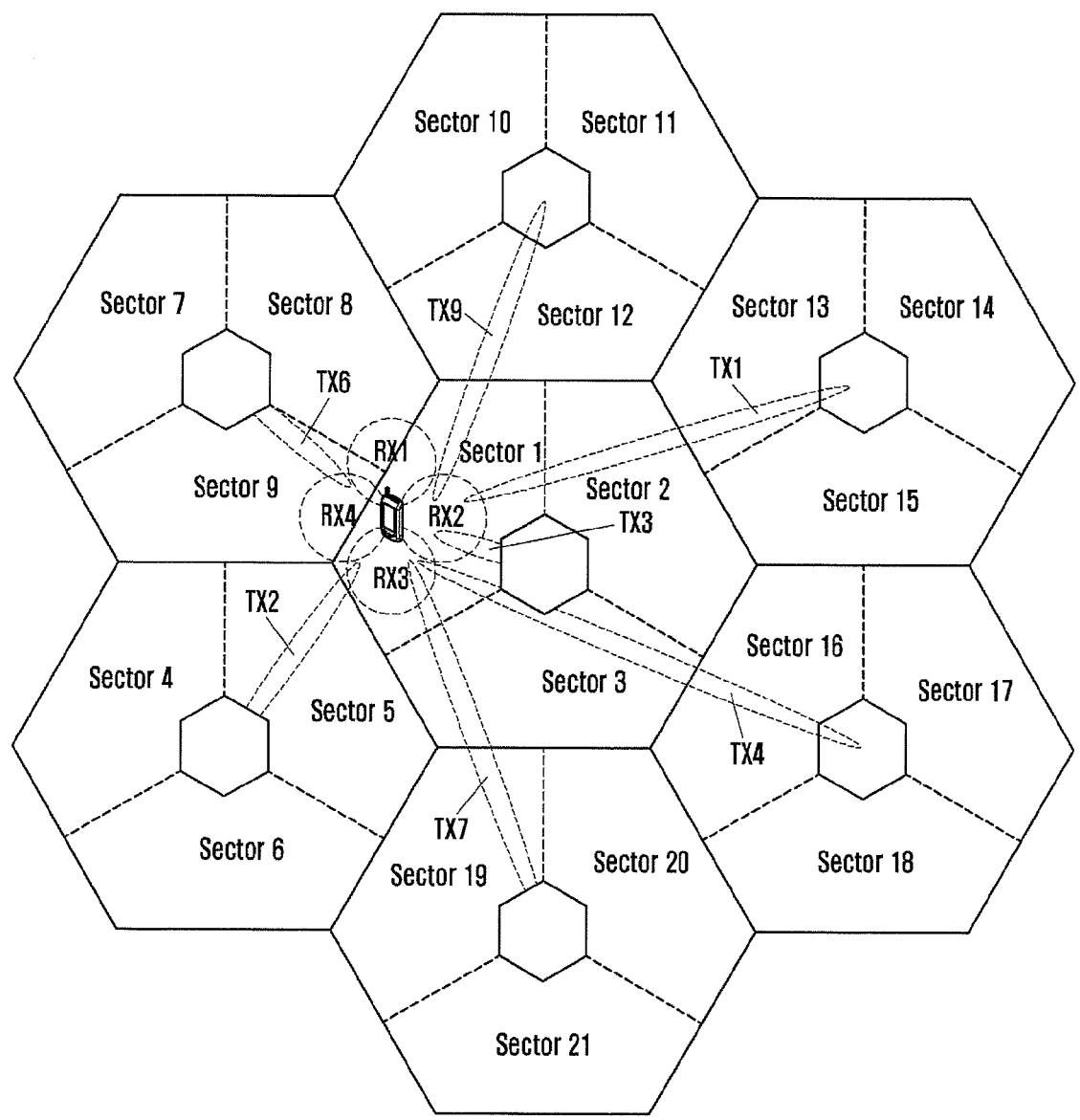
FIG. 7 illustrates an arrangement of several sectors and a mobile station according to another embodiment of the present disclosure.

FIG. 7 illustrates an arrangement of several sectors and a mobile station according to another embodiment of the present disclosure.

Referring to FIG. 7, each of sectors (or base stations) has n transmission beams TX1 to TXn. The sector repeatedly transmits a reference signal for each of the transmission beams by using the corresponding transmission beam once or more. A mobile station receives the reference signal by using four reception beams RX1 to RX4.

Figure 8:
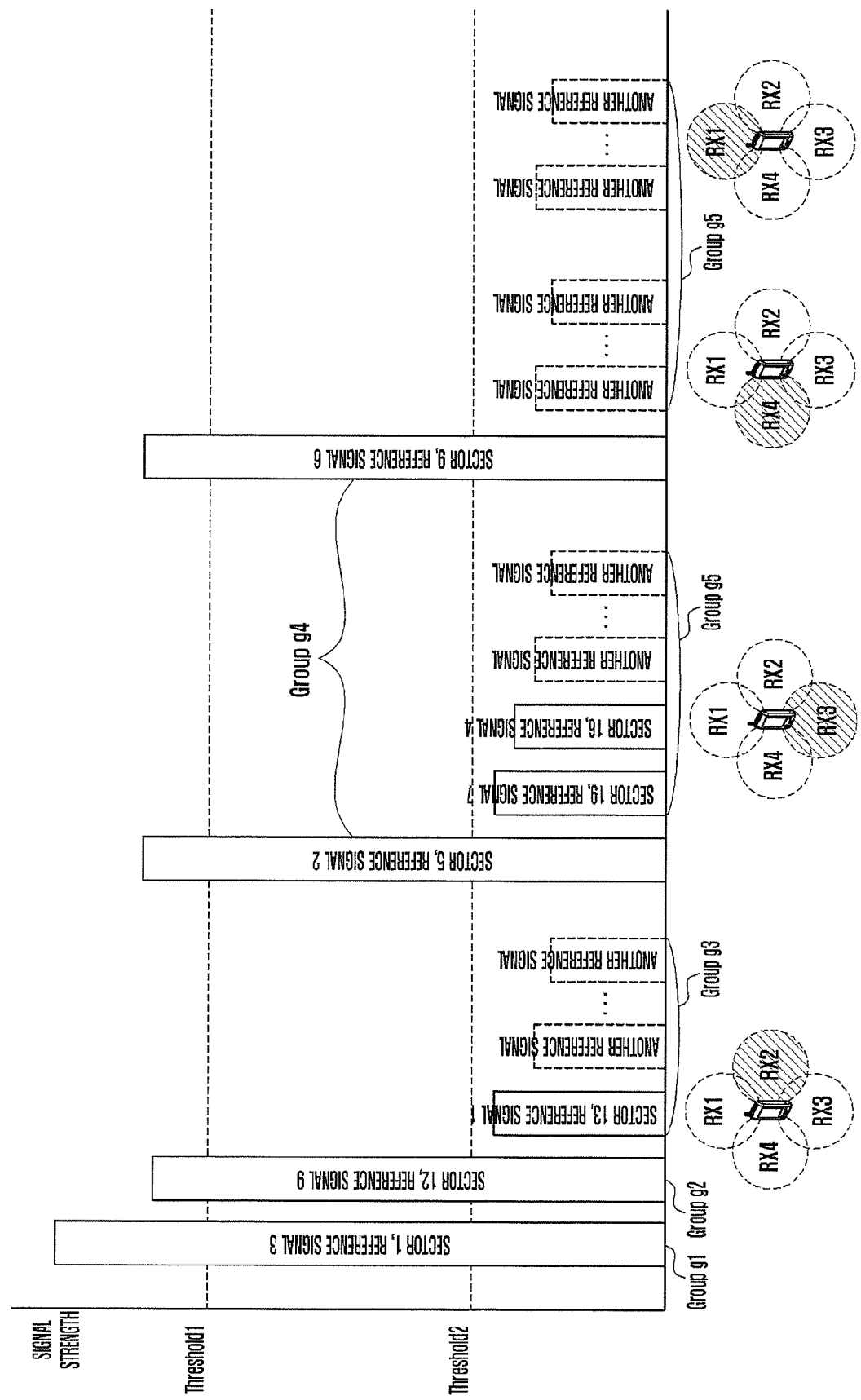
FIG. 8 illustrates classification of transmission/reception beam pairs between the several sectors and the mobile station according to an embodiment of the present disclosure.

FIG. 8 illustrates classification of transmission/reception beam pairs between the several sectors and the mobile station according to an embodiment of the present disclosure. Although the classification method of the embodiments discussed with regard to FIGS. 7 and 8 is similar to that of the embodiments discussed with regard to FIGS. 5 and 6, there is a difference in that reference signals of the several sectors (the base stations) are considered.

Referring to FIG. 8, bars of a chart represent reception signal strength of the respective pairs of the reception beam and the transmission beam (or the reference signal of the corresponding transmission beam) received by the mobile station in FIG. 7. In the embodiment illustrated in FIG. 8, the transmission/reception beams are classified into different groups according to the reception signal strength thereof. In the embodiment illustrated in FIG. 8, reference signal 1 to reference signal N correspond to transmission beams TX1 to TXn, respectively. Further, in the embodiment illustrated in FIG. 8, it is assumed that a third threshold value is identical to a first threshold value and a fourth threshold value is identical to a second threshold value.

Further, for convenience of description, each of the reference signals is denoted as one pair together with the base station transmitting the reference signal. Namely, the reference signal 1 that a sector 13 has transmitted through the transmission beam TX1 is denoted as (sector 13, reference signal 1) together with the sector 13. This will also be applied to an embodiment illustrated in FIG. 10 in the same way. Each of the base stations may transmit one or one or more reference signals and may transmit one or one or more transmission beams.

In the embodiment illustrated in FIG. 8, a reference signal received through a pair of a reception beam RX2 and a transmission beam TX3 of a sector 1 represents the highest reception signal strength. Accordingly, corresponding downlink transmission/reception beam pair ((Sector 1, TX3), RX2) is defined as a first transmission/reception beam group g1. Further, in the embodiment illustrated in FIG. 8, signal strength of a reference signal received through a pair of the reception beam RX2 and a transmission beam TX9 of a sector 12 is higher than the first threshold value so that the transmission/reception beam pair ((Sector 12, TX9), RX2) is defined as a second transmission/reception beam group g2. The first threshold value may be defined as signal strength corresponding to the lowest data transmission rate capable of satisfying a service level required by the mobile station.

In the embodiment illustrated in FIG. 8, among the reference signals of the transmission beams received through the reception beam RX2, the remaining reference signals of the transmission beams except for the reference signal of the transmission beam TX3 of the sector 1 and the reference signal of the transmission beam TX9 of the sector 12 are received with signal strength lower than the second threshold value. Accordingly, among the transmission/reception beam pairs including the reception beam RX2, the transmission/reception beam pairs not including (Sector 1, TX3) and (Sector 12, TX9), namely, ((Sector 1, TX1), RX2), ((Sector 1, TX2), RX2), ((Sector 1, TX4), RX2), ..., ((Sector 1, TXn), RX2), ((Sector 2, TX1), RX2), ..., ((Sector 21, TXn), RX2) are defined as a third transmission/reception beam groups g3. The second threshold value may be defined as minimum signal strength at which data can be transmitted.

In the embodiment illustrated in FIG. 8, signal strength of a reference signal transferred through a reception beam RX3 among the remaining reception beams except for the reception beam RX2 and a transmission beam TX2 of a sector 5 and signal strength of a reference signal transferred through a reception beam RX4 and a transmission beam TX6 of a sector 9 exceed the first threshold value, and the transmission/reception beam pairs ((Sector 5, TX2), RX3) and ((Sector 9, TX6), RX4) are defined as a fourth transmission/reception beam group g4.

Further, except for the transmission/reception beam pairs ((Sector 5, TX2), RX3) and ((Sector 9, TX6), RX4), the remaining transmission beams received through the reception beams RX1, RX3, and RX4 are received with signal strength lower than the second threshold value and the corresponding transmission/reception beam pairs are defined as a fifth transmission/reception beam group g5.

In the embodiment illustrated in FIG. 8, there is no transmission/reception beam belonging to the sixth and seventh transmission/reception beam groups among the groups proposed by the present embodiment.

The classification process of the transmission/reception beam groups as illustrated in FIG. 8 is briefly summarized as follow.

First transmission/reception beam group: one transmission/reception beam pair with the highest signal strength—((Sector 1, TX3), RX2)

Second transmission/reception beam group: among the transmission/reception beam pairs with the signal strength exceeding the first threshold value, the transmission/reception beam pair of which the reception beam is the reception beam RX2 of the first transmission/reception beam group and of which the transmission beam is not the transmission beam TX3 of the first transmission/reception beam group—((Sector 12, TX9), RX2)

Third transmission/reception beam group: among the transmission/reception beam pairs with the signal strength lower than the second threshold value, the transmission/reception beam pairs of which the reception beam is the reception beam RX2 of the first transmission/reception beam group—((Sector 1, TX1), RX2), ((Sector 1, TX2), RX2), ..., ((Sector 1, TX4), RX2), ..., ((Sector 1, TXn), RX2), ((Sector 2, TX1), RX2), ..., ((Sector 21, TXn), RX2)

Fourth transmission/reception beam group: among the transmission/reception beam pairs with the signal strength exceeding the first threshold value, the transmission/reception beam pairs of which the reception beam is not the reception beam RX2 of the first transmission/reception beam group—((Sector 5, TX2), RX3) and ((Sector 9, TX6), RX4)

Fifth transmission/reception beam group: among the transmission/reception beam pairs with the signal strength lower than the second threshold value, the transmission/reception beam pairs of which the reception beam is not the reception beam RX2 of the first transmission/reception beam group—in FIG. 8, all the remaining transmission/reception beam pairs not belonging to the fourth transmission/reception beam group among the transmission/reception beam pairs of which the reception beam is any one of the reception beams RX1, RX3, and RX4

Sixth transmission/reception beam group: among the transmission/reception beam pairs with the signal strength lower than or equal to the first threshold value and higher than or equal to the second threshold value, the transmission/reception beam pair of which the reception beam is the reception beam RX2 of the first transmission/reception beam group—non-existent in FIG. 8

Seventh transmission/reception beam group: among the transmission/reception beam pairs with the signal strength lower than or equal to the first threshold value and higher than or equal to the second threshold value, the transmission/reception beam pair of which the reception beam is not the reception beam RX2 of the first transmission/reception beam group—non-existent in FIG. 8

In the embodiments illustrated in FIGS. 6 and 8, the classification of the transmission/reception beam groups may be performed by the mobile station, and may also be performed by the base station having received the signal strength information from the mobile station or other network entities. Further, both the mobile station and the base station may also perform the classification of the transmission/reception beam groups.

In the embodiments illustrated in FIGS. 6 and 8, the first threshold value which is a criterion for classifying the second and sixth transmission/reception beam groups is used for classifying the fourth and seventh transmission/reception beam groups. However, according to a modified embodiment, although the first threshold value is used as the criterion for classifying the second and sixth transmission/reception beam groups, the third threshold value may also be used for classifying the fourth and seventh transmission/reception beam groups. At this time, the first and third threshold values are different from each other.

Similarly, in the embodiments illustrated in FIGS. 6 and 8, the second threshold value which is a criterion for classifying the third and sixth transmission/reception beam groups is used for classifying the fifth and seventh transmission/reception beam groups. However, according to a modified embodiment, although the second threshold value is used as the criterion for classifying the third and sixth transmission/reception beam groups, the fourth threshold value may also be used for classifying the fifth and seventh transmission/reception beam groups. At this time, the second and fourth threshold values are different from each other.

It can be seen from FIGS. 6 and 8 that the first threshold value is higher than the second threshold value.

In the embodiments illustrated in FIGS. 6 and 8, the signal strength of the transmission/reception beam pair is divided into three areas. The first area is an area in which the signal strength exceeds the first threshold value. The second area is an area in which the signal strength is higher than or equal to the second threshold value and lower than or equal to the first threshold value. The third area is an area in which the signal strength is lower than the second threshold value.

In the embodiments illustrated in FIGS. 6 and 8, the first transmission/reception beam group includes only the transmission/reception beam pair corresponding to the highest signal strength. In addition to that, the second to seventh transmission/reception beam groups are classified under the following two conditions. A first condition is which area (a first area, a second area, and a third area) the signal strength of the transmission/reception beam pair belongs to. A second condition is whether the reception beam of the corresponding transmission/reception beam pair is the reception beam of the first transmission/reception beam group. However, according to a modified embodiment, some of the classifications may not also be performed. For example, the classification using the second threshold value may not be performed. In this case, the sixth and third groups are classified as the same group. Further, the seventh and fifth groups may be classified as the same group. For another example, all the transmission/reception beams corresponding to the signal strength lower than the second threshold value may also be classified as one group irrespective of whether the reception beam thereof is the reception beam of the first transmission/reception beam group. In this case, the third and fifth groups are classified as the same group. As described above, various modifications can be made for the classification methods.

According to an embodiment of the present disclosure, a mobile station defines a transmission/reception beam pair with the smallest reception signal delay among signals transferred through transmission/reception beam pairs as a first transmission/reception beam group. Further, in the present embodiment, the mobile station defines transmission/reception beams with a signal delay difference within a first threshold value as compared with the transmission/reception beam pair (the first transmission/reception beam group) with the smallest signal delay among several transmission beams received through a reception beam of the transmission/reception beam pair with the smallest signal delay measured by the mobile station as a second transmission/reception beam group. Further, in the present embodiment, the mobile station defines transmission/reception beams with a signal delay difference larger than a second threshold value as compared with the transmission/reception beam pair (the first transmission/reception beam group) with the smallest signal delay among the several transmission beams received through the reception beam of the transmission/reception beam pair with the smallest signal delay measured by the mobile station as a third transmission/reception beam group.

Further, in the present embodiment, the mobile station defines transmission/reception beams with a reception signal delay difference within the first threshold value as compared with the transmission/reception beam pair (the first transmission/reception beam group) with the smallest signal delay among several transmission beams received through a reception beam different from the reception beam of the transmission/reception beam pair with the smallest signal delay measured by the mobile station as a fourth transmission/reception beam group. Further, in the present embodiment, the mobile station defines transmission/reception beams with a signal delay difference larger than the second threshold value as compared with the transmission/reception beam pair the first transmission/reception beam group with the smallest signal delay among the several transmission beams received through a reception beam different from the reception beam of the transmission/reception beam pair (the first transmission/reception beam group) with the smallest signal delay measured by the mobile station as a fifth transmission/reception beam group.

Further, in the present embodiment, the mobile station defines transmission/reception beams not belonging to the first and third transmission/reception beam group among the several transmission beams received through the reception beam of the transmission/reception beam pair (the first transmission/reception beam group) with the smallest signal delay measured by the mobile station as a sixth transmission/reception beam group.

Further, in the present embodiment, the mobile station defines transmission/reception beams not belonging to the fourth and fifth transmission/reception beam group among the several transmission beams received through a reception beam different from the reception beam of the transmission/reception beam pair with the smallest signal delay measured by the mobile station as a seventh transmission/reception beam group.

Figure 9:
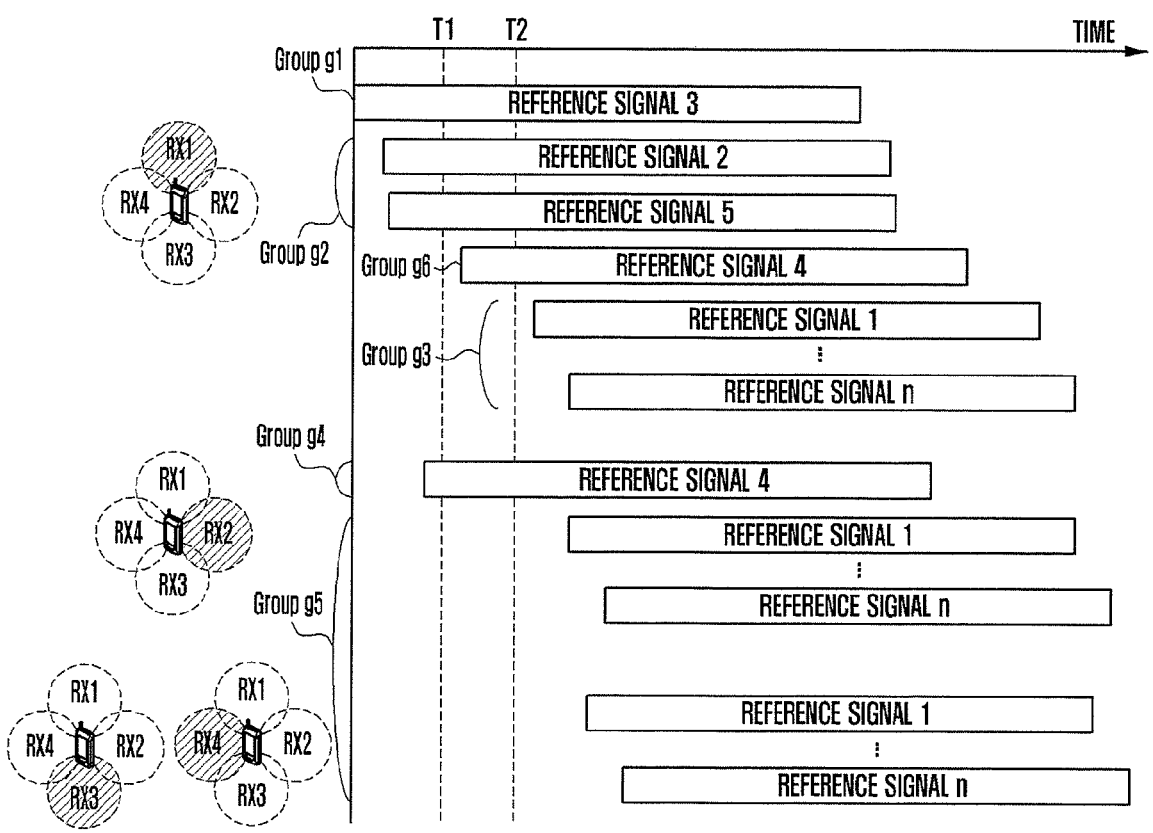
FIG. 9 illustrates a signal delay of reference signals according to another embodiment of the present disclosure.

FIG. 9 illustrates a signal delay of reference signals according to another embodiment of the present disclosure.

Referring to FIG. 9, a reception signal delay of the transmission beams (or the reference signal of the transmission beams) received through the respective reception beams in the system structure illustrated in FIG. 5 is illustrated. Each of bars represents a transmission time point of the reference signal. A horizontal axis is a time axis in a chart illustrated in FIG. 9. A distance between a starting point, namely, a left end of the bar and a starting point of the time axis corresponds to an additional signal delay time interval. Namely, how large the signal delay is based on a signal delay time interval of a transmission/reception beam pair (TX3, RX1) with the smallest signal delay is a criterion for classification of the transmission/reception beam groups. Hereinafter, a difference obtained by comparing the signal delay time interval of the transmission/reception beam pair (TX3, RX1) with the smallest signal delay with a signal delay of another transmission/reception beam pair (x, y) is referred to as an additional signal delay of the transmission/reception beam pair (x, y).

In the embodiment illustrated in FIG. 9, a reference signal of the transmission beam TX3 received through the reception beam RX1 has the smallest reception signal delay, and the corresponding downlink transmission/reception beam pair (TX3, RX1) is defined as a first transmission/reception beam group g1. Further, in the embodiment illustrated in FIG. 9, additional signal delays obtained by comparing reference signals of transmission beams TX2 and TX5 received through the reception beam RX1 with the transmission/reception beam pair (the first transmission/reception beam group) with the smallest signal delay is within a first threshold value T1 so that transmission/reception beam pairs (TX2, RX1) and (TX5, RX1) are defined as a second transmission/reception beam group g2. Since an additional signal delay of a transmission/reception beam pair (TX4, RX1) is larger than or equal to the first threshold value T1 and smaller than a second threshold value T2, and includes the reception beam RX1 of the first transmission/reception beam group, the transmission/reception beam pair (TX4, RX1) is classified as a sixth transmission/reception beam group g6.

In the embodiment illustrated in FIG. 9, the remaining transmission beams except for the reference signals of the transmission beams TX2, TX3, TX4, and TX5 among the transmission beams received through the reception beam RX1 have a signal delay difference exceeding the second threshold value T2 through comparing with the transmission/reception beam pair (the first transmission/reception beam group) with the smallest signal delay and thus, are defined as a third transmission/reception beam group g3.

In the embodiment illustrated in FIG. 9, an additional signal delay of the reference signal of the transmission beam TX4 received through a reception beam RX2 among the remaining reception beams RX2, RX3, and RX4 except for the reception beam RX1 of the first transmission/reception beam group g1 is smaller than the first threshold value T1, and thus, the transmission/reception beam pair (TX4, RX2) is defined as a fourth transmission/reception beam group g4. Further, the remaining transmission/reception beam pairs except for the transmission/reception beam pair (TX4, RX2) among combinations of the reception beams RX2, RX3, and RX4 and the transmission beams have an additional signal delay exceeding the second threshold value T2 and thus, are defined as a fifth transmission/reception beam group g5. In the embodiment illustrated in FIG. 9, there is no transmission/reception beam belonging to the seventh transmission/reception beam group among the groups proposed by the present embodiment The classification process of the transmission/reception beam groups as illustrated in FIG. 9 is briefly summarized as follow.

First transmission/reception beam group: one transmission/reception beam pair with the smallest signal delay—(TX3, RX1)

Second transmission/reception beam group: among the transmission/reception beam pairs with the additional signal delay smaller than the first threshold value, the transmission/reception beam pairs of which the reception beam is the reception beam RX1 of the first transmission/reception beam group and of which the transmission beam is not the transmission beam TX3 of the first transmission/reception beam group—(TX2, RX1) and (TX5, RX1)

Third transmission/reception beam group: among the transmission/reception beam pairs with the additional signal delay exceeding the second threshold value, the transmission/reception beam pairs of which the reception beam is the reception beam RX1 of the first transmission/reception beam group—(TX1, RX1), (TX6, RX1), . . . , (TXn, RX1)

Fourth transmission/reception beam group: among the transmission/reception beam pairs with the additional signal delay smaller than the first threshold value, the transmission/reception beam pair of which the reception beam is not the reception beam RX1 of the first transmission/reception beam group—(TX4, RX2)

Fifth transmission/reception beam group: among the transmission/reception beam pairs with the additional signal delay exceeding the second threshold value, the transmission/reception beam pairs of which the reception beam is not the reception beam RX1 of the first transmission/reception beam group—in FIG. 9, all the remaining transmission/reception beam pairs not belonging to the fourth transmission/reception beam group among the transmission/reception beam pairs of which the reception beam is any one of the reception beams RX2, RX3, and RX4

Sixth transmission/reception beam group: among the transmission/reception beam pairs with the additional signal delay larger than or equal to the first threshold value and smaller than or equal to the second threshold value, the transmission/reception beam pair of which the reception beam is the reception beam RX1 of the first transmission/reception beam group—(TX4, RX1)

Seventh transmission/reception beam group: among the transmission/reception beam pairs with the additional signal delay larger than or equal to the first threshold value and smaller than or equal to the second threshold value, the transmission/reception beam pair of which the reception beam is not the reception beam RX1 of the first transmission/reception beam group—non-existent in FIG. 9.

Figure 10:
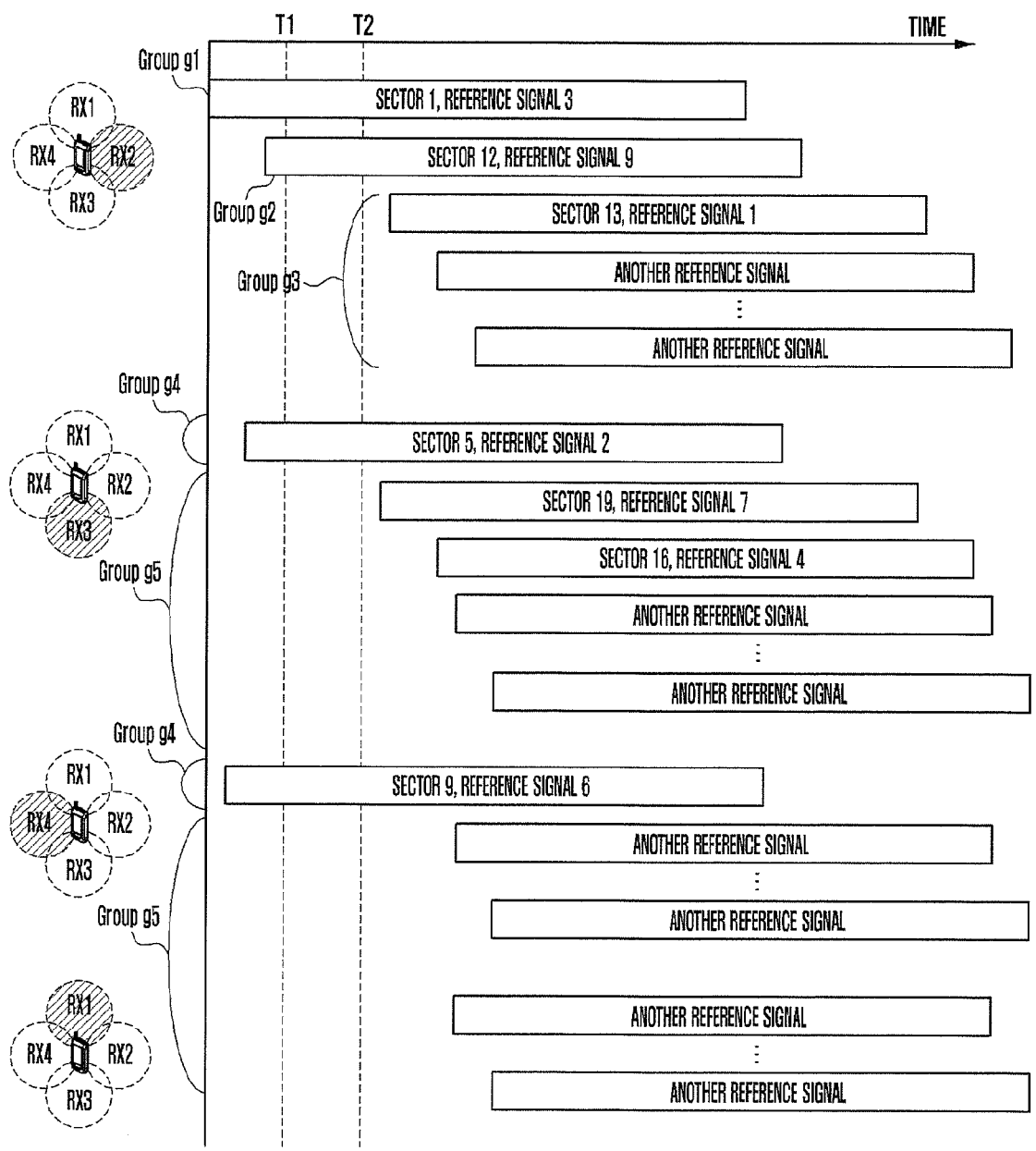
FIG. 10 illustrates a signal delay of reference signals according to another embodiment of the present disclosure.

FIG. 10 illustrates a signal delay of reference signals according to another embodiment of the present disclosure. FIG. 10 illustrates a reception signal delay of the transmission beams (or the reference signal of the transmission beams) received through the respective reception beams in the exemplary system illustrated in FIG. 7. Transmission/reception beams are classified into different groups according to the reception signal delay. Although the classification method of the embodiment discussed with regard to FIG. 10 is similar to that of the embodiment discussed with regard to FIG. 9, there is a difference in that reference signals of the several sectors (the base stations) are considered.

In the embodiment illustrated in FIG. 10, a reference signal transferred through a transmission/reception beam pair of a reception beam RX2 and a transmission beam TX3 of a sector 1 represents the smallest reception signal delay. Accordingly, corresponding downlink transmission/reception beam pair ((Sector 1, TX3), RX2) is defined as a first transmission/reception beam group g1. Further, in the embodiment illustrated in FIG. 10, a reference signal of a transmission/reception beam pair of the reception beam RX2 of the first transmission/reception beam group and a transmission beam TX9 of a sector 12 has an additional signal delay within a first threshold value T1. Accordingly, the transmission/reception beam pair ((Sector 12, TX9), RX2) is defined as a second transmission/reception beam group g2. In the embodiment illustrated in FIG. 10, the remaining transmission beams except for the transmission beam TX3 of the sector 1 and the transmission beam TX9 of the sector 12 among the transmission beams received through the reception beam RX2 have an additional signal delay exceeding a second threshold value T2 and thus, are defined as a third transmission/reception beam group.

In the embodiment illustrated in FIG. 10, an additional signal delay of a reference signal of a transmission beam TX2 of a sector 5 received through a reception beam RX3 among the remaining reception beams RX1, RX3, and RX4 except for the reception beam RX2 and an additional signal delay of a reference signal of a transmission beam TX6 of a sector 9 received through the reception beam RX4 are smaller than the first threshold value T1, and thus, the transmission/reception beam pairs ((Sector 5, TX2), RX3) and ((Sector 9, TX6), RX4) are defined as a fourth transmission/reception beam group g4. Further, the remaining transmission/reception beam pairs except for the transmission/reception beam pairs ((Sector 5, TX2), RX3) and ((Sector 9, TX6), RX4) among the transmission/reception beam pairs including the reception beams RX1, RX3, or RX4 have an additional signal delay exceeding the second threshold value T2 and thus, are defined as a fifth transmission/reception beam group g5. In the embodiment illustrated in FIG. 10, there is no transmission/reception beam belonging to the sixth and seventh transmission/reception beam groups among the groups proposed by the present embodiment.

The classification process of the transmission/reception beam groups as illustrated in FIG. 10 is briefly summarized as follow.

First transmission/reception beam group: one transmission/reception beam pair with the smallest signal delay—((Sector 1, TX3), RX2)

Second transmission/reception beam group: among the transmission/reception beam pairs with the additional signal delay smaller than the first threshold value, the transmission/reception beam pair of which the reception beam is the reception beam RX2 of the first transmission/reception beam group and of which the transmission beam is not the transmission beam TX3 of the first transmission/reception beam group—((Sector 12, TX9), RX2)

Third transmission/reception beam group: among the transmission/reception beam pairs with the additional signal delay exceeding the second threshold value, the transmission/reception beam pairs of which the reception beam is the reception beam RX2 of the first transmission/reception beam group—((Sector 1, TX1), RX2), ((Sector 1, TX2), RX2), ((Sector 1, TX4), RX2), . . . , ((Sector 1, TXn), RX2), ((Sector 2, TX1), RX2), . . . , ((Sector 21, TXn), RX2)

Fourth transmission/reception beam group: among the transmission/reception beam pairs with the additional signal delay smaller than the first threshold value, the transmission/reception beam pairs of which the reception beam is not the reception beam RX2 of the first transmission/reception beam group—((Sector 5, TX2), RX3) and ((Sector 9, TX6), RX4)

Fifth transmission/reception beam group: among the transmission/reception beam pairs with the additional signal delay exceeding the second threshold value, the transmission/reception beam pairs of which the reception beam is not the reception beam RX2 of the first transmission/reception beam group—in FIG. 10, all the remaining transmission/reception beam pairs not belonging to the fourth transmission/reception beam group among the transmission/reception beam pairs of which the reception beam is any one of the reception beams RX1, RX3, and RX4

Sixth transmission/reception beam group: among the transmission/reception beam pairs with the additional signal delay larger than or equal to the first threshold value and smaller than or equal to the second threshold value, the transmission/reception beam pair of which the reception beam is the reception beam RX2 of the first transmission/reception beam group—non-existent in FIG. 10

Seventh transmission/reception beam group: among the transmission/reception beam pairs with the additional signal delay larger than or equal to the first threshold value and smaller than or equal to the second threshold value, the transmission/reception beam pair of which the reception beam is not the reception beam RX2 of the first transmission/reception beam group—non-existent in FIG. 10

In the embodiments illustrated in FIGS. 9 and 10, the classification of the transmission/reception beam groups may be performed by the mobile station, and may also be performed by the base station having received the signal strength information from the mobile station or other network entities. Further, both the mobile station and the base station may also perform the classification of the transmission/reception beam groups.

In the embodiments illustrated in FIGS. 9 and 10, the first threshold value which is a criterion for classifying the second and sixth transmission/reception beam groups is used for classifying the fourth and seventh transmission/reception beam groups. However, according to a modified embodiment, although the first threshold value is used as the criterion for classifying the second and sixth transmission/reception beam groups, the third threshold value may also be used for classifying the fourth and seventh transmission/reception beam groups. At this time, the first and third threshold values are different from each other.

Similarly, in the embodiments illustrated in FIGS. 9 and 10, the second threshold value which is a criterion for classifying the third and sixth transmission/reception beam groups is used for classifying the fifth and seventh transmission/reception beam groups. However, according to a modified embodiment, although the second threshold value is used as the criterion for classifying the third and sixth transmission/reception beam groups, the fourth threshold value may also be used for classifying the fifth and seventh transmission/reception beam groups. At this time, the second and fourth threshold values are different from each other.

It can be seen from FIGS. 9 and 10 that the first threshold value is smaller than the second threshold value.

In the embodiments illustrated in FIGS. 9 and 10, the additional signal delay of the transmission/reception beam pair is divided into three areas. The first area is an area in which the additional signal delay is smaller than the first threshold value. The second area is an area in which the additional signal delay is smaller than or equal to the second threshold value and larger than or equal to the first threshold value. The third area is an area in which the additional signal delay exceeds the second threshold value.

In the embodiments illustrated in FIGS. 9 and 10, the first transmission/reception beam group includes only the transmission/reception beam pair with the smallest signal delay. In addition to that, the second to seventh transmission/reception beam groups are classified under the following two conditions. A first condition is which area (a first area, a second area, and a third area) the additional signal delay of the transmission/reception beam pair belongs to. A second condition is whether the reception beam of the corresponding transmission/reception beam pair is the reception beam of the first transmission/reception beam group. However, according to a modified embodiment, some of the classifications may not also be performed. For example, the classification using the second threshold value may not be performed. In this case, the sixth and third groups are classified as the same group. Further, the seventh and fifth groups may be classified as the same group. For another example, all the transmission/reception beams corresponding to the signal strength lower than the second threshold value may also be classified as one group irrespective of whether the reception beam thereof is the reception beam of the first transmission/reception beam group. In this case, the third and fifth groups are classified as the same group. As described above, various modifications can be made for the classification methods.

The embodiment discussed with regard to FIG. 9 and the embodiment discussed with regard to FIG. 10 have the classification method similar to that of the embodiment discussed with regard to FIG. 6 and the embodiment discussed with regard to FIG. 8. However, the classification method according to signal strength is employed for the embodiments discussed with regard to FIGS. 6 and 8, and the classification method according to a signal delay is employed for the embodiments discussed with regard to FIGS. 9 and 10. According to a modified embodiment, a classification criterion through a combination of the signal strength and the signal delay may be used, or both the classification according to the signal strength and the classification according to the signal delay may also be applied. An indicator for a channel state representing a similar type of channel quality or channel state may also be utilized for the classification instead of the signal strength/the signal delay. For example, Channel State Information (CSI), a Channel Quality Indicator (CQI), a signal to noise ratio, a signal to interference and noise ratio, and other similar indicators for a channel quality/a channel state may be utilized for the classification.

Hereinafter, information on a criterion for classification of groups is referred to a group setting rule. The group setting rule includes, for example, threshold values of a channel state that are criteria for the classification of the transmission/reception beam groups. For example, the group setting rule may include at least one of threshold values of signal strength that are criteria for the group classification and threshold values of a signal delay that are criteria for the group classification. The group setting rule may also be transferred from a base station to a mobile station, and a rule promised in advance may also be used as the group setting rule.

According to an embodiment of the present disclosure, for transmission beams belonging to respective transmission/reception beam groups, a mobile station may measure reference signals for the respective transmission beams at different periods and report the measurement results at different periods according to beam forming characteristics, beam forming capability of a transmitter and a receiver, importance of information on the corresponding transmission/reception beam in a scheduling operation of the transmitter, and the like.

According to an embodiment of the present disclosure, channel information on the transmission/reception beam pair belonging to the first transmission/reception beam group of the various embodiments, namely, the group having the most excellent channel state is more frequently measured and reported than channel information on the transmission/reception beam pairs belonging to other groups. This is because the information of the corresponding transmission/reception beam pair of the first transmission/reception beam group is more importantly used than the information of other transmission/reception beam pairs in a case of scheduling.

Further, in the method proposed by the present disclosure, the transmission/reception beam pairs belonging to the second and third transmission/reception beam groups of the various embodiments include the same reception beam as the first transmission/reception beam group. Accordingly, the reference signals of the transmission/reception beam pairs belonging to the second and third transmission/reception beam groups can be easily measured by using the same reception beam while the reference signal of the transmission/reception beam pair of the first transmission/reception beam group is measured. Information of the transmission/reception beam pairs belonging to the second and third transmission/reception beam groups is usefully used for the scheduling operation of the base station. Accordingly, in the method proposed by the present disclosure, the mobile station should more frequently measure the transmission/reception beam pairs belonging to the second and third transmission/reception beam groups to report the measurement results than the transmission/reception beams (the fourth and fifth transmission/reception beam groups) received through the reception beams other than the reception beam of the transmission/reception beam pair with the highest signal strength (the most excellent channel state or the smallest signal delay). Further, since information on the transmission/reception beam pairs of the fourth and fifth transmission/reception beam groups among the transmission/reception beams including the reception beams other than the reception beam of the transmission/reception beam pair with the highest signal strength (the most excellent channel state or the smallest signal delay) is used for the scheduling operation of the base station in a relatively useful way, the mobile station should more frequently measure the transmission/reception beam pairs belonging to the fourth and fifth transmission/reception beam groups to report the measurement results than the transmission/reception beam pairs belonging to the sixth and seventh transmission/reception beam groups.

In the present embodiment, the measurement period may not be identical to the report period, and a separate period according to the transmission/reception beam group may also be applied to only one of the measurement period and the report period.

According to another embodiment of the present disclosure, the mobile station may report the signal measurement results for the transmission/reception beams belonging to the respective transmission/reception beam groups through different communication means according to beam forming characteristics, beam forming capability of a transmitter and a receiver, importance of information on the corresponding transmission/reception beam in a scheduling operation of the transmitter, and the like. According to the present embodiment, a method used for reporting the measurement results for the transmission/reception beams may include at least one of a physical channel, a Medium Access Control (MAC) transport channel or MAC message, and a signaling message. According to the present embodiment, a mobile station may periodically or aperiodically report the signal measurement results of the transmission/reception beams to a base station by using at least one of the aforementioned communication methods.

According to the present embodiment, the mobile station may report the measurement result of the transmission/reception beam belonging to the first transmission/reception beam group of the various embodiments by using a physical channel having a delay smaller than the measurement results of the transmission/reception beams belonging to other transmission/reception beam groups. This is because the measurement result of the first transmission/reception beam group is more importantly used than the measurement results of other transmission/reception beam groups. Further, according to the present embodiment, the reference signals of the transmission/reception beam pairs belonging to the second and third transmission/reception beam groups can be easily measured by using the reception beam when the transmission/reception beam pair belonging to the first transmission/reception beam group is measured.

Further, information of the transmission/reception beam pairs belonging to the second and third transmission/reception beam groups is usefully used for the scheduling operation of the base station. Accordingly, according to various embodiments of the present disclosure, the mobile station may report the measurement results of the transmission/reception beam pairs of the second and third transmission/reception beam groups by using the physical channel identically with the measurement result of the transmission/reception beam pair belonging to the first transmission/reception beam group. According to various embodiments of the present disclosure, when there are a number of transmission/reception beam pairs belonging to the third transmission/reception beam group, the mobile station may report the measurement results of the transmission/reception beams belonging to the third transmission/reception beam group by using a MAC transport channel or MAC message. According to various embodiments of the present disclosure, the mobile station may report the measurement results of the transmission/reception beams belonging to the remaining groups by using a signaling message.

According to the present embodiment, the mobile station may use a transmission means with a small delay for the transmission/reception beam pairs of the transmission/reception beam group needing to be more frequently reported, and may use a transmission means with a large delay for the transmission/reception beam pairs of the transmission/reception beam group that can be less frequently reported.

According to another embodiment of the present disclosure, the mobile station may report the measurement result with different contents for the transmission/reception beams belonging to the respective groups according to beam forming characteristics, beam forming capability of a transmitter and a receiver, importance of information on the corresponding transmission/reception beam in a scheduling operation of the transmitter, and the like. According to the present embodiment, the measurement result for the transmission/reception beam may include an index of the transmission/reception beam, instantaneous signal strength of a reference signal, signal strength of a reference signal filtered for a specific period of time, average signal strength of a reference signal measured in the whole frequency area, signal strength of a reference signal measured in partial frequency areas, information on one or more multiple antenna layers, signal strength of a reference signal of one or more multiple antenna layers, multiple antenna precoding matrix index, and the like. Further, in the present embodiment, the measurement result for the transmission/reception beam pair may include information in a bitmap form indicating whether a specific transmission/reception beam is larger or smaller than a predetermined threshold value. In the present embodiment, the mobile station may report one or more information of the measurement results for the measured transmission/reception beams to the base station.

In the present embodiment, since information of the transmission/reception beam pair belonging to the first transmission/reception beam group of the various embodiments is more importantly used than information of other transmission/reception beam pairs in a case of scheduling, the mobile station should report enough information for the transmission/reception beam pair belonging to the first transmission/reception beam group to the base station. For example, the mobile station may report a transmission/reception beam index, instantaneous signal strength information of a reference signal measured for partial frequency areas, and one or more multiple antenna information for the transmission/reception beam pair belonging to the first transmission/reception beam group. Further, according to present embodiment, in the case of the transmission/reception beam pairs belonging to the second and third transmission/reception beam groups, the reference signals can be easily measured by using the same reception beam when the transmission/reception beam pair belonging to the first transmission/reception beam group is measured. Further, information of the transmission/reception beam pairs belonging to the second and third transmission/reception beam groups is usefully used for the scheduling operation of the base station. Accordingly, according to the present embodiment, the mobile station should report more information for the transmission/reception beam pairs belonging to the second and third transmission/reception beam groups than any other transmission/reception beam group except for the first transmission/reception beam group. For example, the mobile station may report a transmission/reception beam index, instantaneous signal strength information of a reference signal measured for the whole frequency area, some multiple antenna information for the transmission/reception beam pairs belonging to the second and third transmission/reception beams groups. According to the present embodiment, when there are a number of transmission/reception beams belonging to the third transmission/reception beam group, the mobile station may report information as to whether signal strength of the corresponding transmission beam is lower than a threshold value, in a bitmap form indicating whether the signal strength of the corresponding transmission beam is lower than the threshold value, for the transmission/reception beam pairs belonging to the third transmission/reception beam group.

Further, since information of the transmission/reception beam pairs belonging to the fourth and fifth transmission/reception beam group among the transmission/reception beams received through the reception beams other than the reception beam of the transmission/reception beam pair with the highest signal strength is used for the scheduling operation of the base station in a relatively useful way, the mobile station may report information to a degree similar to the transmission/reception beam pairs belonging to the second and third transmission/reception beam groups, for the transmission/reception beam pairs belonging to the fourth and fifth transmission/reception beam groups. In the present embodiment, for the transmission/reception beams belonging to the remaining group (the sixth and seventh transmission/reception beam groups), the mobile station may report more brief information than that of the transmission/reception beams belonging to other groups.

Table 1 illustrates reporting methods for the respective transmission/reception beam groups according to an embodiment of the present disclosure.

TABLE 1

| | Transmission/reception beam group | | | |
|---|---|---|---|---|
| | First transmission/ reception group | Second transmission/ reception beam group, Third transmission/ reception beam group | Fourth transmission/ reception beam group, Fifth transmission/ reception beam group | Sixth transmission/ reception beam group, Seventh transmission/ reception beam group |
| Measurement period and/or Report period | First shortest | Second shortest | Third shortest | Longest |
| Transfer means | Physical channel (First smallest delay) | Physical channel (First smallest delay) | MAC transmission channel or MAC message (Second smallest delay) | Signaling message (Largest delay) |
| Report contents | First most | Second most | Second most (the same as left) | Fewest |

The contents of Table 1 are only an embodiment of the present disclosure, and classification of groups or applying parameters may be differently set in an actual example. All of the measurement/report periods, the transfer means, and the report contents may be differently set according to the transmission/reception beam groups, or only some of the measurement/report periods, the transfer means, and the report contents may be differently set according to the transmission/reception beam groups.

In addition to those illustrated in Table 1, separate reporting condition may also be set for the respective transmission/reception beam groups. For example, for the transmission/reception beam pairs belonging to the sixth and seventh transmission/reception beam groups, the mobile station may also report the measurement results only when the channel state of the corresponding transmission/reception beam pair is above/below a predetermined level (e.g., a level that needs to change the group). On the other hand, for the first transmission/reception beam group, the mobile station may report the measurement results for the transmission/reception beam pair at every period without any specific condition.

Hereinafter, the signal measuring/reporting methods differently set for the respective transmission/reception beam groups as illustrated in Table 1 are referred to as a measurement rule. The measurement rule may include, for example, indication information on at least one of a signal measurement period, a measurement result report period, a measurement result transfer means, and report contents, which correspond to each of the transmission/reception beam groups. The measurement rule may also be transferred from the base station to the mobile station, and a rule promised in advance may also be used as the measurement rule.

Figure 11:
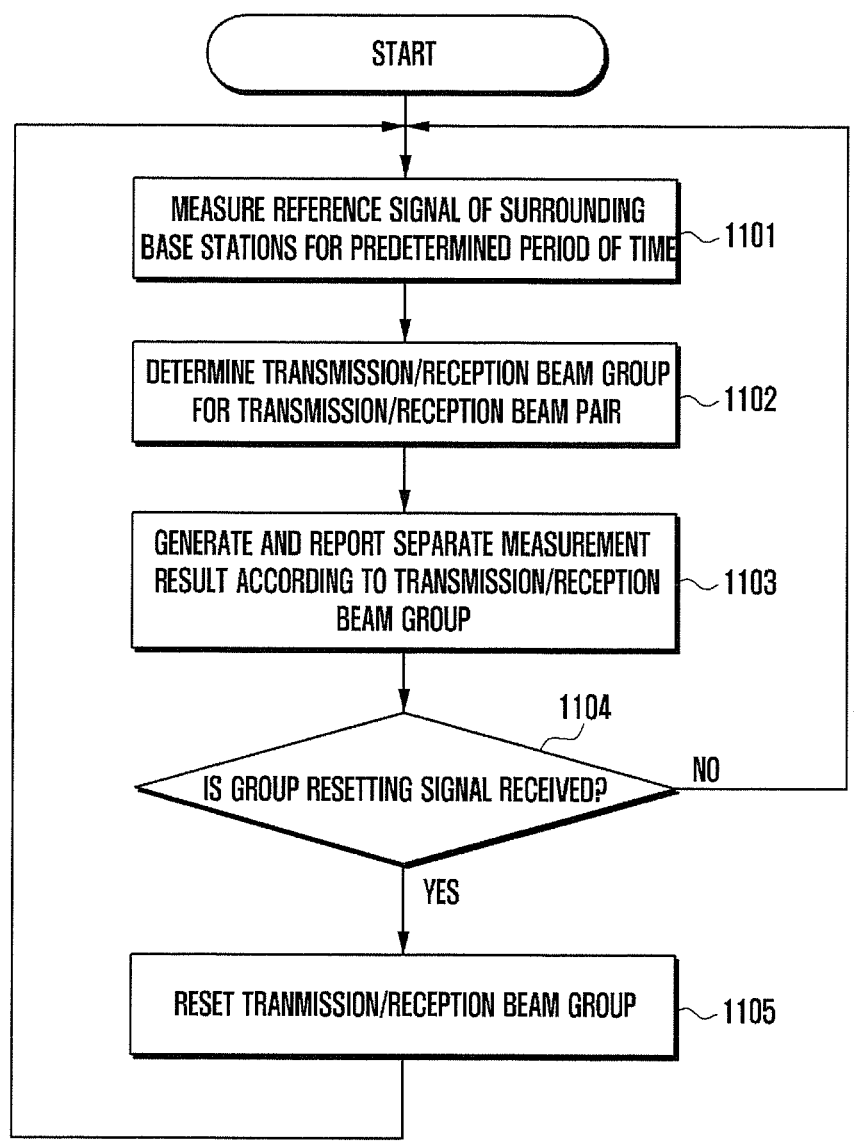
FIG. 11 is a flowchart illustrating a process of measuring reference signals by a mobile station according to an embodiment of the present disclosure.

FIG. 11 is a flowchart illustrating a process of measuring reference signals by a mobile station according to an embodiment of the present disclosure.

Referring to FIG. 11, the mobile station performs an operation of measuring transmission/reception beam pairs of respective transmission/reception beam groups once or more at every preset measurement period corresponding to the corresponding transmission/reception beam group for a predetermined period of time according to a predetermined transmission/reception beam classification, in step 1101. The transmission/reception beam group classification and the measurement period corresponding to the transmission/ reception beam group, which are used in step 1101, may be set when the mobile station first sets a connection, or may be configured according to a transmission/reception beam group setting/resetting signal transmitted by the base stations. According to a modified embodiment, the mobile station may measure all reference signals once or more at the same period irrespective of the transmission/reception beam groups.

In step 1102, the mobile station determines beams configuring the transmission/reception beam group based on the measurement result again. For example, in a case where a transmission/reception beam with the highest reception signal strength is different from that when the reference signals have been previously measured, the mobile station changes the member of the first transmission/reception beam group in step 1102. The classification/configuration of the transmission/reception beam groups has been described above in detail with reference to FIGS. 5 to 10. The mobile station classifies the transmission/reception beam groups according to any one or combinations of the embodiments described with reference to FIGS. 5 to 10. According to a modified embodiment, the mobile station may omit a resetting operation for the transmission/reception beam groups in step 1102. In this case, the mobile station maintains the transmission/reception beam groups according to an instruction of the base stations.

In step 1103, the mobile station generates a measurement result of preset members corresponding to the respective transmission/reception beam groups, and reports the result according to a reporting method corresponding to the corresponding transmission/reception beam group. The measurement result reporting method may include, for example, at least one of a result report through a physical channel, a result report through a MAC transport channel or a MAC message, and a result report through a signaling message. The measurement result information generated by the mobile station in step 1103 may include, for example, at least one of an index of a transmission/reception beam, instantaneous signal strength of a reference signal, signal strength of a reference signal filtered for a specific period of time, average signal strength of a reference signal measured in the whole frequency area, signal strength of a reference signal measured for each of partial frequency areas, information on one or more multiple antenna layers, signal strength of a reference signal of one or more multiple antenna layers, and a multiple antenna precoding matrix index. To differently set one or more of a measurement period, a report period, a measurement report transfer means, and measurement report contents is the same as that illustrated with reference to Table 1.

In step 1104, the mobile station determines whether a transmission/reception beam group resetting signal has been received from the base station. If having received the transmission/reception beam group resetting signal, the mobile station proceeds to step 1105. The mobile station resets the transmission/reception beam groups according to the instruction of the base station in step 1105, and returns to step 1101 to repeat the measurement of the reference signal. If having not received the transmission/reception beam group resetting signal, the mobile station maintains the current transmission/reception beam groups and returns to step 1101 to perform the measurement of the reference signal. Namely, the mobile station performs the measurement of the reference signal and the reporting according to the previously set transmission/reception beam group classification until receiving the transmission/reception beam group resetting signal.

Figure 12:
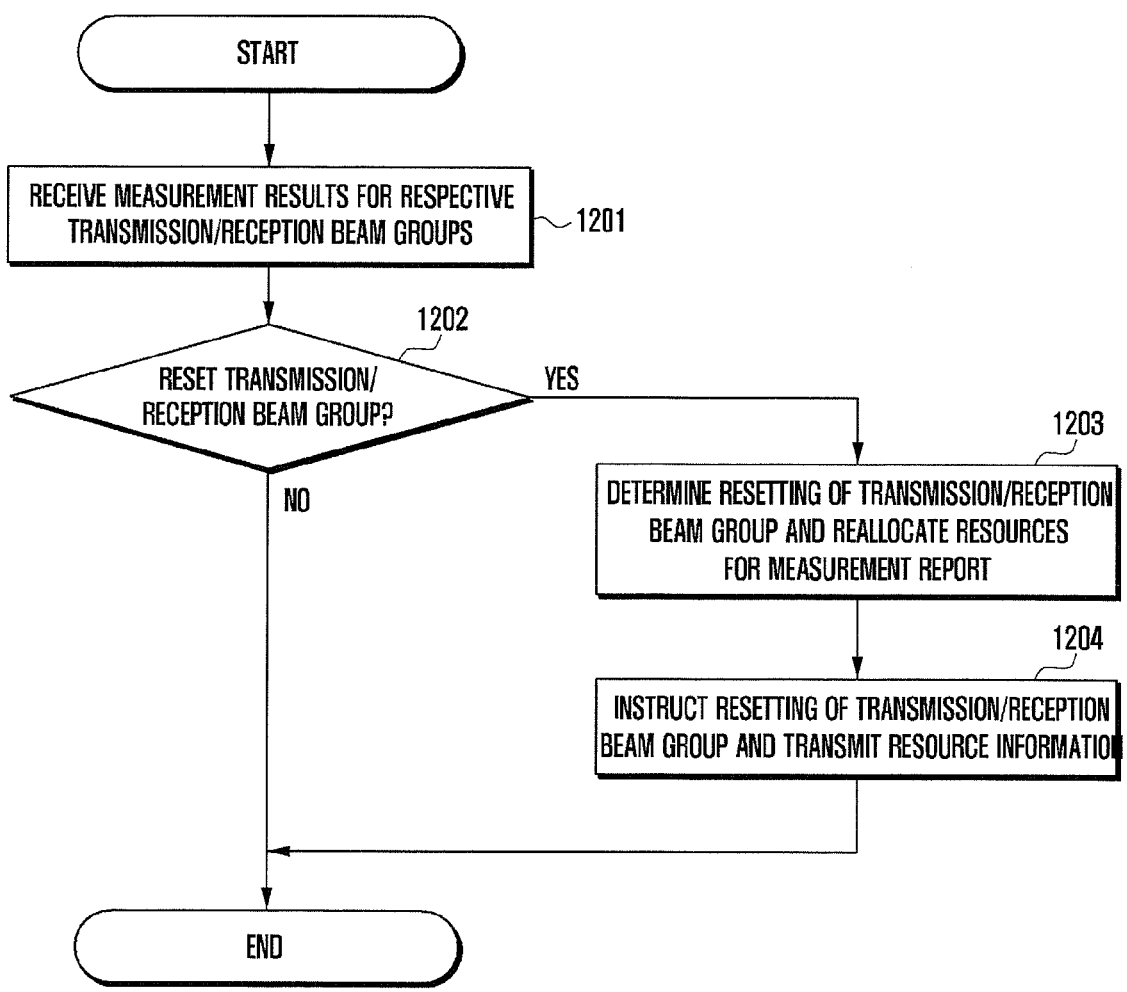
FIG. 12 is a flowchart illustrating a process of processing measurement result information by a base station according to an embodiment of the present disclosure.

FIG. 12 is a flowchart illustrating a process of processing measurement result information by a base station according to an embodiment of the present disclosure.

Referring to FIG. 12, the base station receives measurement information which mobile stations measure and report once or more according to measurement periods corresponding to respective predetermined transmission/reception beam groups for transmission/reception beams belonging to the respective predetermined transmission/reception beam groups, in step 1201. Transmission/reception beam group classification and the measurement periods corresponding to the respective transmission/reception beam groups, which are used in step 1201, may be set when the mobile stations first set a connection, or may be configured according to a transmission/reception beam group setting/resetting signal transmitted by the base station.

In step 1202, the base station determines whether to reset transmission/reception beam groups for a specific mobile station. The base station may determine to reset the transmission/reception beam groups, when there are transmission/reception beam pairs having a channel state (signal strength and/or a signal delay) that basically does not conform to the current transmission/reception beam group classification. A criterion for determining discord between the transmission/reception beam group classification and the current channel state may be identical to the classification criteria of the various embodiments. According to a modified embodiment, the transmission/reception beam group classification may also be made unchanged until the channel state is significantly changed, by offsetting the threshold values used in the respective embodiments by a specific value. For example, in a case of the first threshold value used in the embodiment discussed with regard to FIG. 5, namely, the criterion for classification between the second and sixth transmission/reception beam groups, another threshold value, lower than the first threshold value, obtained by subtracting a specific offset value from the first threshold value at the time of the classification may be used when it is determined that transmission/reception beam pairs classified as the second transmission/reception beam group are beyond the second transmission/reception beam group. On the other hand, when it is determined that transmission/reception beam pairs out of the second transmission/reception beam group are included in the second transmission/reception beam group, another threshold value, higher than the first threshold value, obtained by adding a specific offset value to the first threshold value may be used. When the threshold value is differently set, the group classification is not changed for a relatively small channel change but may be changed for a large channel change.

However, the base station may not make the same determination for all discord of the transmission/reception beam group classification. For example, when the transmission/reception beam pair belonging to the first transmission/reception beam group is changed, the base station may determine to reset the transmission/reception beam group. However, when only the transmission/reception beam pairs belonging to the sixth and seventh transmission/reception beam groups are changed, the base station may determine not to reset the transmission/reception beam groups. For the discord of the group classification of the transmission/reception beams belonging to the second to seventh transmission/reception beam groups (or other predetermined groups), the base station may determine to reset the transmission/reception beam groups, when there is discord between the current transmission/reception beam group classification and the channel state for a preset number or more or a preset ratio or more of transmission/reception beams.

In step 1202, if the transmission/reception beam pair configuring, for example, the first transmission/reception beam group is changed, the base station may determine to reset the transmission/reception beam group. Further, when the transmission/reception beams corresponding to the third or fifth transmission/reception beam group, namely, a group with an inferior channel state have reception signal strength high enough to belong to the second or fourth transmission/reception beam group, namely, a group with a superior channel state, the base station may determine to reset the transmission/reception beam group. Further, when the transmission/reception beams of the third or fifth transmission/reception beam group have a channel state excellent enough to belong to the sixth or seventh transmission/reception beam group, the base station may determine to reset the transmission/reception beam group. Further, when the transmission/reception beams of the sixth or seventh transmission/reception beam group have a channel state excellent enough to belong to the second or fourth transmission/reception beam group, the base station may determine to reset the transmission/reception beam group. The base station determines a necessity for the resetting of the transmission/reception beam groups under one or more of the aforementioned conditions or conditions similar to the aforementioned conditions. Here, the classification illustrated in any one of the various embodiments has been described as an example of the classification of the transmission/reception beam groups.

If the base station determines to reset transmission/reception beam groups for a specific mobile station, the base station proceeds to step 1203. In step 1203, the base station resets the transmission/reception beam groups based on the measurement results of the transmission/reception beams reported by the mobile station, and sets one or more of a signal measurement/report period for each of the groups, report contents, and a method to report the measurement result. Further, in step 1203, the base station reallocates resources for measurement report suitably to the set report method. Thereafter, in step 1204, the base station transmits information on the resetting of the transmission/reception beams and resource information for the measurement report to the corresponding mobile station, and completes a measurement report reception operation.

Figure 13:
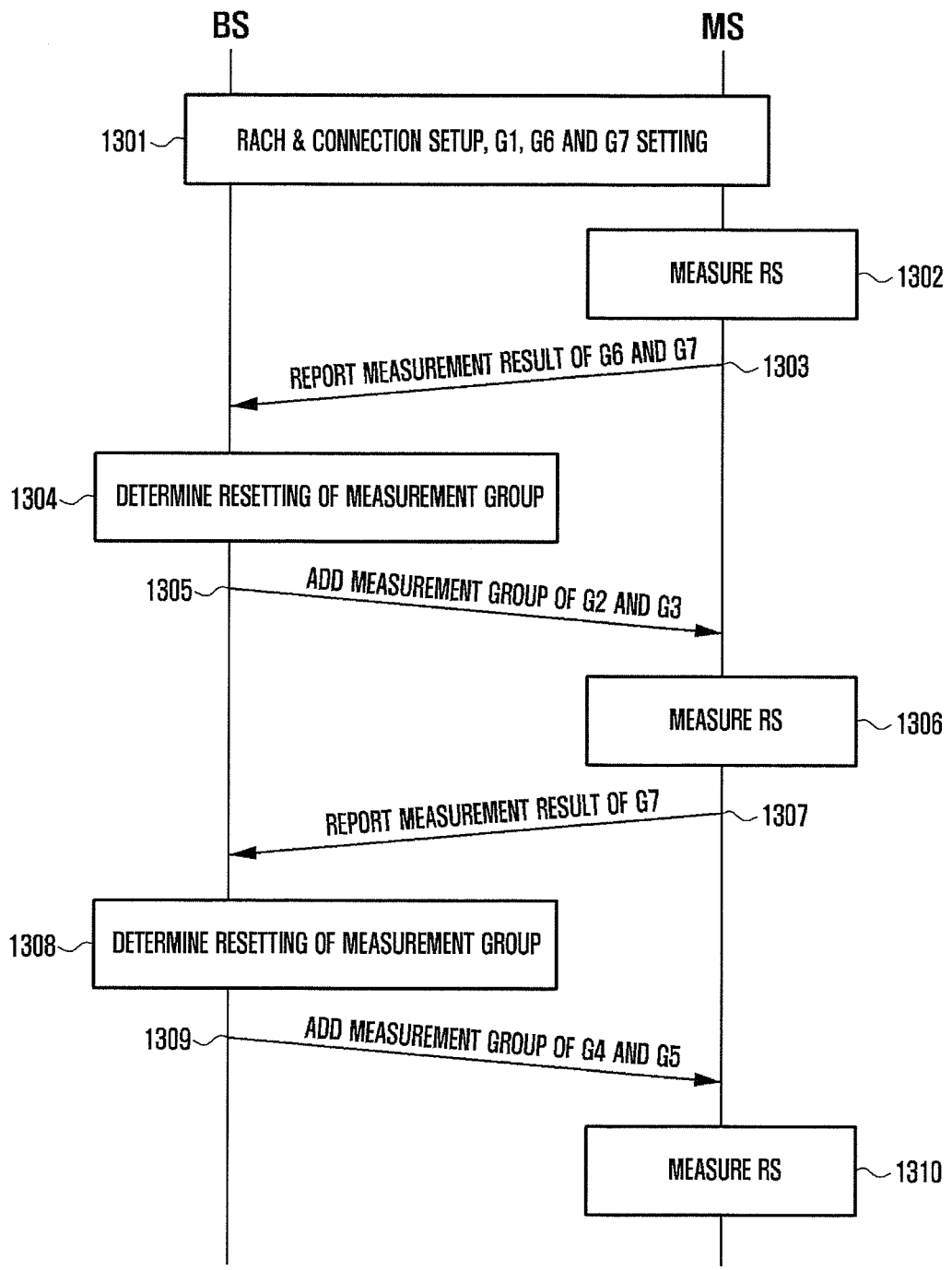
FIG. 13 is a signal flow diagram illustrating a process of configuring transmission/reception beam groups by a mobile station and a base station according to an embodiment of the present disclosure.

FIG. 13 is a signal flow diagram illustrating a process of configuring transmission/reception beam groups by a mobile station and a base station according to an embodiment of the present disclosure.

Referring to FIG. 13, the mobile station and the base station set a transmission/reception beam pair with the highest signal strength among transmission/reception beams as a first transmission/reception beam group g1, and set all the remaining transmission/reception beams as sixth and seventh transmission/reception beam groups g6 and g7, while setting a first connection through random access and a connection setting process, in step 1301. Further, the base station sets signal measurement periods corresponding to the respective transmission/reception beam groups g1, g6, and g7 and a method to report measurement results, in step 1301. As described above with reference to Table 1, the base station may transmit a setting for a measurement report period and/or report contents to the mobile station.

In step 1302, the mobile station measures reference signals corresponding to the respective transmission/reception beam pairs according to the measurement periods set in step 1301. If the transmission/reception beams belonging to the sixth or seventh transmission/reception beam group g6 or g7 satisfy a measurement report criterion in step 1302, the mobile station reports the measurement results for the transmission/reception beam group g6 or g7, in step 1303. In step 1304, the base station determines based on the measurement results of the mobile station whether to reset the transmission/reception beam groups. In the embodiment illustrated in FIG. 13, as a result of the determination, the base station determines addition of setting for transmission/reception beam groups g2 and g3, in step 1304. In step 1305, the base station transfers, to the mobile station, an instruction for addition of the transmission/reception beam groups g2 and g3, threshold values of signal strength that are criteria for classifying the groups g2, g3, g6, and g7, signal measurement periods of the respective groups g1, g2, g3, g6, and g7, a method to report measurement results, and resource information required for reporting the measurement results.

In step 1306, the mobile station measures reference signals corresponding to the respective transmission/reception beam pairs according to information on the transmission/reception beam groups reset in step 1305. In the embodiment illustrated FIG. 13, it is assumed that transmission/reception beams belonging to the seventh transmission/reception beam group g7 satisfy the measurement report criterion as a result of the reference signal measurement by the mobile station in step 1306. In step 1307, the mobile station reports the measurement results for the seventh transmission/reception beam group g7 to the base station. In step 1308, the base station having received the measurement results of the mobile station determines whether to reset the transmission/reception beam groups, based on the measurement results of the mobile station received in step 1308. In the embodiment illustrated in FIG. 13, it is assumed that the base station has determined setting of new transmission/reception beam groups g4 and g5, in step 1308. In step 1309, the base station transfers, to the mobile station, an instruction for addition of the new transmission/reception beam groups g4 and g5, setting information on g4 and g5, threshold values of signal strength that are criteria for classifying the groups g2, g3, g4, g5, g6, and g7, signal measurement periods of the respective groups g1, g2, g3, g4, g5, g6, and g7, a method to report measurement results, and resource information required for reporting the measurement results. In step 1310, the mobile station continuously measures reference signals and reports the measurement results to the base station according to the set beam group information.

Figure 14:
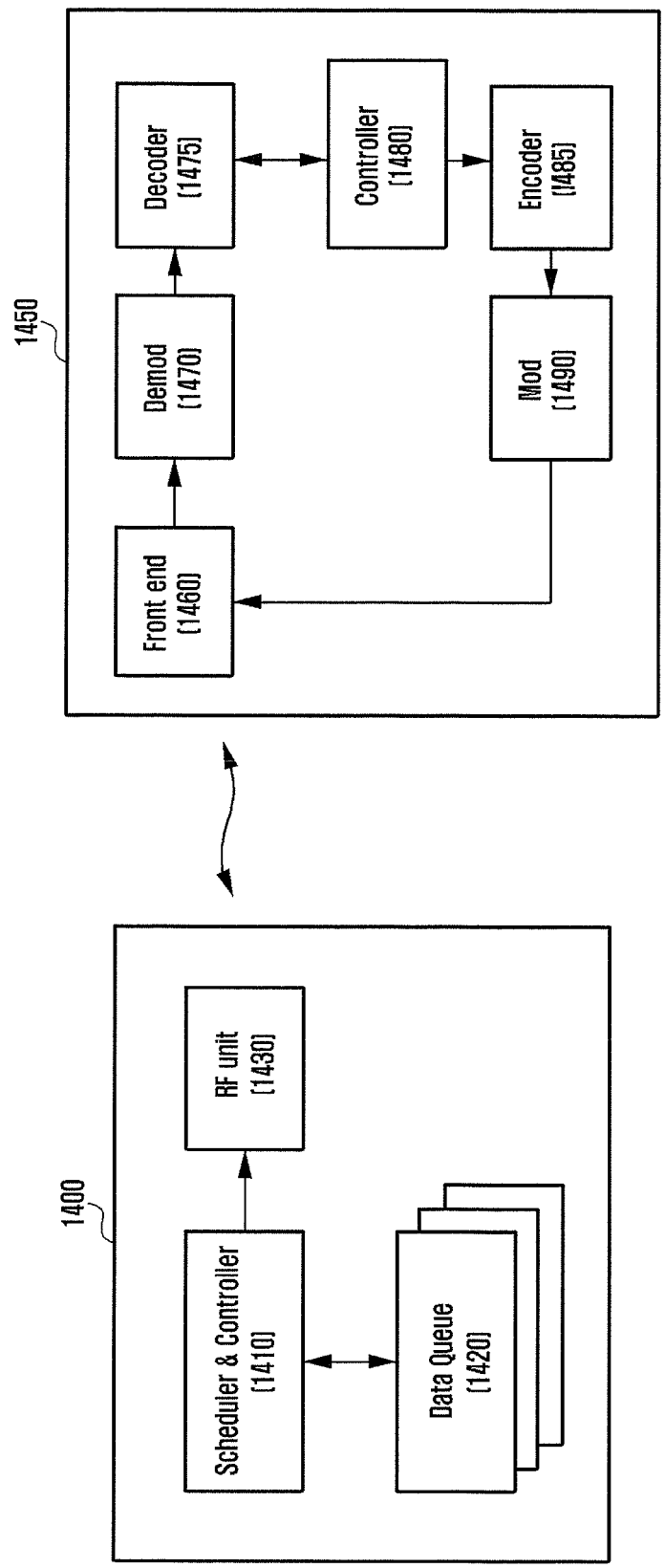
FIG. 14 illustrates a block diagram of a base station 1400 and a mobile station 1450 according to an embodiment of the present disclosure.

FIG. 14 illustrates a block diagram of a base station 1400 and a mobile station 1450 according to an embodiment of the present disclosure.

Referring to FIG. 14, the base station 1400 according to various embodiments of the present disclosure includes a scheduler/controller (hereinafter, referred to as a controller) 1410, a Radio Frequency (RF) unit (a communication unit) 1430, and a data queue 1420.

The mobile station 1450 according to various embodiments of the present disclosure includes a front end 1460, a demodulator 1470, a decoder 1475, a controller 1480, an encoder 1485, and a modulator 1490. The front end 1460, the demodulator 1470, the decoder 1475, the encoder 1485, and the modulator 1490 participating in transmission/reception of wireless communication may be generically referred to as a communication unit.

The data queue 1420 sequentially stores data which is processed by the base station 1400 and provides the data to the controller 1410. The controller 1410 controls the RF unit 1430 to perform communication with the mobile station 1450. The RF unit 1430 performs communication with the mobile station 1450 under the control of the controller 1410. Particularly, the controller 1410 according to various embodiments of the present disclosure receives a measurement report and performs a resetting instruction and other necessary actions if it is necessary to reset transmission/reception beam groups, according to the embodiment described with reference to FIG. 12.

The front end 1460 receives a signal from the base station 1400 and transmits a signal to the base station 1400. The front end 1460 transfers the received signal to the demodulator 1470. The demodulator 1470 demodulates the received signal and transfers the demodulated signal to the decoder 1475. The decoder 1475 decodes the demodulated signal and transfers the decoded signal to the controller 1480. The controller 1480 performs an appropriate operation according to the received signal and transfers a signal to transmit to the encoder 1485. The encoder 1485 encodes the transferred signal and transfers the encoded signal to the modulator

1490. The modulator 1490 modulates the encoded signal. The modulated signal is transferred to the base station through the front end 1460.

Particularly, the controller 1480 according to various embodiments of the present disclosure controls the respective elements of the mobile station 1450 to perform an operation such as signal measurement, group setting, group resetting, and the like, according to the embodiment described with reference to FIG. 11. Particularly, the controller 1480 classifies transmission/reception beam groups according to the embodiments described with reference to FIGS. 5 to 10, and performs a process of signal measurement/report for the respective transmission/reception beam groups according to the setting as illustrated in Table 1.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, generation means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" or "module" refers to a software element or a hardware element, such as a Field Programmable Gate Array (FPGA) or an Application Specific Integrated Circuit (ASIC), which performs a predetermined function. However, the "unit" or "module" does not always have a meaning limited to software or hardware. The "unit" or "module" may be constructed either to be stored in an addressable storage medium or to execute one or more processors. Therefore, the "unit" or "module" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" or "module" may be either combined into a smaller number of elements, "unit", or "module" or divided into a larger number of elements, "unit", or "module". Moreover, the elements and "units" or "modules" may be implemented to reproduce one or more CPUs within a device or a security multimedia card.

Those skilled in the art can appreciate that it is possible to implement the present disclosure in another specific form without changing the technical idea or the indispensable characteristics of the present disclosure. Therefore, it should be understood that the above-described embodiments are illustrative and are not limiting under any possible interpretation. The scope of the present disclosure is defined by the appended claims to be described later, rather than the detailed description. Accordingly, it should be appreciated that all modifications or variations derived from the meaning and scope of the appended claims and their equivalents are included in the range of the present disclosure. Although specific exemplary embodiments have been described in the detailed description of the present disclosure, various modifications may be made without departing from the scope of the present disclosure. Thus, the scope of the present disclosure shall not be determined merely based on the described exemplary embodiments and rather determined based on the accompanying claims and the equivalents thereto.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of measuring a signal by a wireless communication mobile station, the method comprising:
measuring a first signal for each of beam pairs for a preset period of time;
classifying the beam pairs into two or more beam groups according to a result of the measurement and a group setting rule; and
transmitting measurement result information for the beam pairs according to report configuration information corresponding to a beam group,
wherein the report configuration information is configured differently for each of the beam groups.

2. The method of claim 1, further comprising:
measuring a second signal for the beam pairs based on measurement configuration information corresponding to the beam group,
wherein the report configuration information is determined based on the beam group, and
wherein the group setting rule comprises at least one of one or more signal strength threshold values that are criteria for group classification or one or more signal delay threshold values that are criteria for the group classification.

3. The method of claim 2, wherein:
the signal strength threshold values comprise a first threshold value and a second threshold value lower than the first threshold value,
classifying the beam pairs comprises classifying the beam pairs having reception signal strength higher than the first threshold value, the beam pairs having reception signal strength lower than or equal to the first threshold value and higher than or equal to the second threshold value, and the beam pairs having reception signal strength lower than the second threshold value as mutually different groups.

4. The method of claim 2, wherein:
the signal delay threshold values comprise a first threshold value and a second threshold value larger than the first threshold value, and
classifying the beam pairs comprises classifying the beam pairs having a signal delay smaller than the first threshold value, the beam pairs having a signal delay larger than or equal to the first threshold value and smaller than or equal to the second threshold value, and the beam pairs having a signal delay larger than the second threshold value as mutually different groups.

5. The method of claim 1, wherein the report configuration information comprises measurement report period related information, measurement report method related information, or measurement report contents related information, which correspond to each of the beam groups.

6. The method of claim 1, wherein classifying the beam pairs comprises setting a beam pair having a largest signal delay or a highest signal strength as a first beam group and setting remaining beam pairs as another group.

7. The method of claim 6, wherein the remaining beam pairs are classified into different groups according to whether a reception beam included in each of the beam pairs is a reception beam of the first beam group.

8. The method of claim 7, wherein the group setting rule comprises one or more signal strength threshold values that are criteria for the group classification, and the remaining beam pairs are classified into different groups according to a comparison result between corresponding signal strength and the one or more signal strength threshold values.

9. The method of claim 7, wherein the group setting rule comprises one or more signal delay threshold values that are criteria for the group classification, and the remaining beam pairs are classified into different groups according to a comparison result between a corresponding signal delay and the one or more signal delay threshold values.

10. The method of claim 1, further comprising:
receiving a beam group reconfiguration indication from a base station; and
reclassifying the beam pairs into the beam groups based on the group setting rule.

11. The method of claim 1, further comprising:
receiving a beam group addition indication and a group reconfiguration information; and
classifying the beam pairs into two or more beam groups including at least one added beam group based on the received group reconfiguration information.

12. The method of claim 11, wherein the group reconfiguration information comprises a threshold value to which a threshold value comprised in the group reconfiguration information is adjusted or a threshold value comprised in the group setting rule and an added threshold value.

13. A wireless communication mobile station for measuring a signal, the wireless communication mobile station comprising:
a transceiver configured to transmit and receive a signal; and
a controller configured to:
measure first a signal for each of beam pairs for a preset period of time;
classify the beam pairs into two or more beam groups according to a result of the measurement and a group setting rule, and
transmit measurement result information for the beam pairs according to report configuration information corresponding to a beam group,
wherein the report configuration information is configured differently for each of the beam groups.

14. The wireless communication mobile station of claim 13, wherein the controller is further configured to measure a second signal for the beam pairs based on measurement configuration information corresponding to the beam group,
wherein the report configuration information is determined based on the beam group, and
wherein the group setting rule comprises at least one of one or more signal strength threshold values that are criteria for group classification or one or more signal delay threshold values that are criteria for the group classification.

15. The wireless communication mobile station of claim 14, wherein:
the signal strength threshold values comprise a first threshold value and a second threshold value lower than the first threshold value, and
the controller is configured to classify the beam pairs having reception signal strength higher than the first threshold value, the beam pairs having reception signal strength lower than or equal to the first threshold value and higher than or equal to the second threshold value, and the beam pairs having reception signal strength lower than the second threshold value as mutually different groups.

16. The wireless communication mobile station of claim 14, wherein:
the signal delay threshold values comprise a first threshold value and a second threshold value larger than the first threshold value, and
the controller is configured to classify the beam pairs having a signal delay smaller than the first threshold value, the beam pairs having a signal delay larger than or equal to the first threshold value and smaller than or equal to the second threshold value, and the beam pairs having a signal delay larger than the second threshold value as mutually different groups.

17. The wireless communication mobile station of claim 13, wherein
the report configuration information comprises measurement report period related information, measurement report method related information, or measurement report contents related information, which correspond to each of the beam groups.

18. The wireless communication mobile station of claim 13, wherein the controller is configured to set the beam pair having a largest signal delay or a highest signal strength as a first beam group and set remaining beam pairs as another group.

19. The wireless communication mobile station of claim 18, wherein the remaining beam pairs are classified into different groups according to whether a reception beam included in each of the beam pairs is a reception beam of the first beam group.

20. The wireless communication mobile station of claim 19, wherein the group setting rule comprises one or more signal strength threshold values that are criteria for the group classification, and the remaining beam pairs are classified into different groups according to a comparison result between corresponding signal strength and the one or more signal strength threshold values.

21. The wireless communication mobile station of claim 19, wherein the group setting rule comprises one or more signal delay threshold values that are criteria for the group classification, and the remaining beam pairs are classified into different groups according to a comparison result between a corresponding signal delay and the one or more signal delay threshold values.

22. The wireless communication mobile station of claim 18, wherein the controller is configured to receive a beam group reconfiguration indication from a base station, and reclassify the beam pairs into the beam groups based on the group setting rule.

23. The wireless communication mobile station of claim 22, wherein the controller is configured to:
receive a beam group addition indication and a group reconfiguration information, and
classify the beam pairs into two or more beam groups including at least one added beam group based on the received group reconfiguration information.

24. The wireless communication mobile station of claim 23, wherein the group reconfiguration information comprises a threshold value to which a threshold value comprised in the group reconfiguration information is adjusted or a threshold value comprised in the group reconfiguration information and an added threshold value.

25. A method of receiving a measurement report by a wireless communication base station, the method comprising:
transmitting a reference signal to a mobile station;
receiving measurement result information for beam pairs according to report configuration information corresponding to a beam group, from a mobile station;
wherein the beam pairs are classified into two or more beam groups according to a group setting rule, and
wherein the report configuration information is configured differently for each of the beam groups.

26. A wireless communication base station using beam forming, comprising:
a transceiver configured to transmit and receive a signal; and
a controller configured to:
transmit a reference signal to a mobile station,
receive measurement result information for beam pairs according to report configuration information corresponding to a beam group, from a mobile station, and
wherein the beam pairs are classified into two or more beam groups according to a group setting rule, and
wherein the report configuration information is configured differently for each of the beam groups.

* * * * *